(12) United States Patent
Manwaring

(10) Patent No.: US 8,925,431 B2
(45) Date of Patent: Jan. 6, 2015

(54) REFACING TOOLS AND METHODS

(71) Applicant: Magna-Sonic Stress Testers Inc., Vernal, UT (US)

(72) Inventor: Kevin K. Manwaring, Vernal, UT (US)

(73) Assignee: Magna-Sonic Stress Testers, Inc., Vernal, UT (US)

( * ) Notice: Subject to any disclaimer, the term of this patent is extended or adjusted under 35 U.S.C. 154(b) by 0 days.

(21) Appl. No.: 14/307,159

(22) Filed: Jun. 17, 2014

(65) Prior Publication Data

US 2014/0338506 A1 Nov. 20, 2014

Related U.S. Application Data

(60) Division of application No. 12/955,450, filed on Nov. 29, 2010, and a continuation of application No. PCT/US2013/043399, filed on Jun. 14, 2013.

(51) Int. Cl.
*B23B 5/16* (2006.01)
(52) U.S. Cl.
CPC .............. *B23B 5/16* (2013.01); *B23B 2215/72* (2013.01); *B23B 2215/68* (2013.01); *B23B 2220/08* (2013.01)
USPC ................................................ 82/113; 82/128
(58) Field of Classification Search
CPC ..................................................... B23C 3/122
USPC ............. 82/113, 128; 408/224; 451/439, 358, 451/57, 58
See application file for complete search history.

(56) References Cited

U.S. PATENT DOCUMENTS

| 57,756 | A | | 9/1886 | Osborne |
|---|---|---|---|---|
| 692,459 | A | | 2/1901 | Langlois |
| 1,477,651 | A | | 12/1923 | Koeln |
| 1,515,548 | A | | 11/1924 | Cerotsky |
| 1,701,329 | A | | 2/1929 | McIntosh |
| 1,753,935 | A | | 4/1930 | Maisch |
| 2,092,637 | A | | 9/1937 | Brown |
| 2,159,287 | A | | 5/1939 | Morgan |
| 2,164,572 | A | | 7/1939 | Christman |
| 2,164,573 | A | | 7/1939 | Christman |
| 2,211,183 | A | | 8/1940 | Tytus |
| 2,218,147 | A | * | 10/1940 | Greenwood ..................... 82/128 |
| 2,243,976 | A | | 6/1941 | Norton |
| 2,478,310 | A | | 8/1949 | Payne |
| 2,528,474 | A | | 10/1950 | Moore |
| 2,802,319 | A | | 8/1957 | Hume |
| 3,119,209 | A | | 1/1964 | Moore |
| 3,142,139 | A | * | 7/1964 | Mangum ....................... 451/439 |
| 3,181,398 | A | | 5/1965 | Rogers |
| 3,561,302 | A | | 2/1971 | Keener |
| 3,608,406 | A | | 9/1971 | Paysinger |
| 3,691,882 | A | | 9/1972 | Massey |
| 3,717,055 | A | | 2/1973 | Pendleton |
| 3,881,396 | A | | 5/1975 | Case |
| 4,149,436 | A | * | 4/1979 | Blattler ........................... 82/113 |

(Continued)

OTHER PUBLICATIONS

International Search Report and Opinion, PCTUS2013/043399, Mailed Feb. 27, 2014.

*Primary Examiner* — Daniel Howell
*Assistant Examiner* — Ryan Rufo
(74) *Attorney, Agent, or Firm* — Workman Nydegger

(57) ABSTRACT

A high-torque connection refacing tool, including a shaft, a mandrel, a primary face plate, and a torque-stop face plate.

20 Claims, 24 Drawing Sheets

(56) References Cited

U.S. PATENT DOCUMENTS

| | | |
|---|---|---|
| 4,665,780 A | 5/1987 | Plaquin |
| 4,761,104 A | 8/1988 | Hillestad |
| 4,854,200 A | 8/1989 | Mynhier |
| 4,954,023 A | 9/1990 | Bromley |
| 5,062,187 A | 11/1991 | Bromley |
| 5,433,130 A | 7/1995 | Smith |
| 5,852,962 A | 12/1998 | Fraering |
| 6,355,318 B1 | 3/2002 | Tailor |
| 7,662,026 B2 * | 2/2010 | Lewis .............................. 451/28 |
| 7,784,551 B2 | 8/2010 | Angman |
| 8,784,161 B1 | 7/2014 | Burleson |
| 2012/0132044 A1 | 5/2012 | Manwaring |

* cited by examiner

REFACING TOOLS AND METHODS

CROSS-REFERENCE TO RELATED APPLICATIONS

This application is a divisional of U.S. patent application Ser. No. 12/955,450, filed Nov. 29, 2010, and entitled REFACING TOOLS AND METHODS. This application is also a continuation of PCT Patent Application No. PCT/US2013/043399, filed Jun. 14, 2013, and entitled REFACING TOOLS AND METHODS. Each of the above-noted application is incorporated herein by reference in its entirety.

BACKGROUND OF THE INVENTION

1. The Field of the Invention

The invention relates to apparatuses for refacing a pipe connection and methods of refacing a pipe connection. The tools and methods described herein are particularly useful in the field of refacing drill pipe.

2. Background and Relevant Art

Tubular members, such as those used in oilfield applications, are often joined by threaded rotary shoulder connections. For example, rotary shoulder connections are used in the oil field to join sections of drill pipe and other related assemblies together. In a rotary shoulder connection, the shoulders, also referred to as faces and seals, are pressed together by the threads. The thread flanks jack against each other pushing the shoulders into each other. The shoulders provide strength and integrity to the connection and also work as seals to seal drilling fluid pumped through the inside of the pipe. In a conventional rotary shoulder connection, each piece of pipe to be connected has one face/seal. If the condition of the face/seal is not smooth, it can leak and result in a connection failure. In addition, over-torque of the connection can over-stress the threads and shoulder and cause a connection failure. See API RP-7G-2/ISO 10407-2, Recommended Practice for Inspection and Classification of Used Drill Stem Elements, First Edition (August 2009).

High torque connections overcome many of the disadvantages associated with conventional rotary shoulder connections. High torque connections involve two seals, a primary seal and secondary seal. In a high torque connection, the primary seal makes contact at the same time as the secondary seal. The secondary seal serves as a torque-stop and a seal which prevent the connection from being over torqued and thereby avoids many of the disadvantages associated with conventional rotary shoulder connections.

Due to the primary and secondary seal design in high torque connections, it is critical that the length of the primary seal to the secondary seal remains the same. In establishing connections, both faces must be smooth and perpendicular to the thread direction to ensure a proper seal. If, however, a face is flawed or damaged with scratches, nicks, or other irregularities, it must be refaced prior to being used. During use of the pipe and assembly components, connections may be repeatedly made up and broken resulting in repeated face to face contact and wear. The resulting wear may result in sealing faces that are scored, nicked, or scratched or that no longer present a planar surface at right angles to the longitudinal axis of the pipe. When such conditions occur, the face-to-face contact may not form a proper pressure seal, thereby leading to connection failures. The connection must then be refaced prior to use.

Prior attempts to recondition the faces of pipe have employed methods that are costly or inconvenient and equipment that is expensive and/or unavailable in the field. For example, the faces may be re-tooled in a machine shop. However, re-tooling in a machine shop involves expensive and inconvenient transportation costs to transport the damaged/flawed pipe to the shop. There is a need for tools and/or methods for refacing high torque connections in the field.

U.S. Pat. No. 5,433,130 to Smith et al. describes portable shoulder dressing apparatuses. The shoulder dressing apparatuses include a mandrel, a mandrel securing means for securing the mandrel to the threaded end portion of the tubular connection; a piston assembly, the piston assembly being axially and rotatably movable relative to the mandrel; at least one cutter carried by said piston assembly; biasing means for applying a biasing force to the piston assembly to move the piston assembly axially relative the at least one shoulder and to urge the cutter into contact with the at least one shoulder, the biasing means being disposed between the mandrel and the piston assembly; and rotating means for rotating the piston assembly while the piston assembly is moved axially whereby the cutter can remove material from the at least one shoulder. In U.S. Pat. No. 5,433,130 the mandrel is attached to the connection via a threaded mandrel and the cutters are pressed into the shoulder to be refaced by a compression chamber employing pneumatic or hydraulic pressure.

U.S. Pat. No. 5,852,962 to Camille Fraering describes a field tool to reface high-torque pipe connections. The tool is known in the field as "The Lightning Refacer." U.S. Pat. No. 5,852,962 sets forth difficulties associated with using a threaded mandrel and presents an alternative design. The Lightning Refacer instead incorporates, inter alia, a spring loaded cone that slides over the pin or box connection threads. The tool is held into position by the spring loaded cone, then a rotating body mounted with tungsten carbide cutters and powered by portable driver, such as an 8" angle grinder or Hole Hawg®, spins around the cone to reface the target surface.

The Lighting Refacer, however, has shortcomings when used in the field. For example, the tool operator must apply equal pressure, keeping faces at a right angel to the threads while pushing the refacing tool towards the connection faces. If unequal pressure is applied, the primary and secondary faces will be crooked with respect to the axis of the threads, and the length from one measurement to another measurement at 180 degrees away from the first will not be within acceptable tolerances. Maintaining equal pressure can be difficult for an operator resulting in crooked faces that are not within acceptable tolerances. In addition, even if equal pressure is applied, the refaced faces may still be crooked with respect to the axis of the threads if the tool is operated out of line with the axis of the threads. In addition, the tungsten carbide cutters can chip, causing irregularities on the face. Furthermore, for the Lighting Refacer to work, the physical condition of the threads must be smooth and free of any raised metal. Frequently, in high-torque connections used in drilling, the threads sharpen during repeatedly making up and breaking out the connection, resulting in threads that are raised and narrow. These sharpened threads impede the Lightning Refacer from easily sliding onto the threads. As such, often the threads must be dressed prior to refacing by using a dye grinder with a flapper wheel. This process is time consuming and can affect the subsequent accuracy of the reface.

BRIEF SUMMARY OF THE INVENTION

The invention relates to apparatuses for refacing a pipe connection and methods of refacing a pipe connection. For instance, in one exemplary implementation, a refacing tool is usable for refacing torque-stop and primary faces of a box-end of a pipe. The refacing tool includes a mandrel that has an external thread sized and configured to screw into an internal thread of the box-end of the pipe. The tool also includes a shaft that has a first portion with a first outside diameter and a second portion with a second, smaller outside diameter. The first portion of the shaft is slidably and rotatably secured within the mandrel. The shaft includes a through hole that passes through the shaft along a length thereof. The shaft also includes an internal thread. The refacing tool also includes a torque-stop face plate and a primary face plate. The torque-stop face plate is connected to the shaft and has a first abrasive surface configured for refacing the torque-stop face of the box-end of the pipe. The primary face plate is connected to the shaft and has a second abrasive surface configured for refacing the primary face of the box-end of the pipe.

According to another exemplary implementation, a refacing tool is usable for refacing torque-stop and primary faces of a pin-end of a pipe. The refacing tool includes a mandrel having internal threads configured to screw onto external threads of the pin-end of the pipe. The mandrel also has one or more openings in a sidewall. A barrel of the refacing tool is slidably and rotatably fitted over the mandrel, and includes a barrel sleeve having one or more openings. The one or more openings in the mandrel and the one or more openings in the barrel sleeve cooperate to enable visual inspection of the torque-stop face while the mandrel is screwed onto the pin-end of the pipe and the barrel is fitted over the mandrel. The barrel also includes proximal and distal rims connected to or integrated with the barrel sleeve. A primary face plate is connected to the distal rim of the barrel. A driving shaft is coupled to the barrel and is rotatably and slidably secured within the mandrel. A torque-stop face plate is connected to the driving shaft and positioned within the mandrel.

In still another implementation, a method for refacing torque-stop and primary faces of a pin-end of a pipe includes securing a mandrel on the pin-end of a pipe, rotatably fitting a barrel over the mandrel, rotating torque-top and primary face plates relative to and in contact with the torque-stop and primary faces of a pin-end of a pipe, and visually inspecting the torque-stop and primary faces while the mandrel is secured on the pin-end of the pipe and the barrel is fitted over the mandrel.

In some implementations, the torque-stop face plate and/or the primary face plate may include abrasive disk (e.g., a sandpaper with adhesive backing, which may be a pressure sensitive adhesive). Accordingly, a user can detachably secure and replace (as needed) such adhesive disks to the torque-stop face plate and/or to the primary face plate. Implementations also may involve both the torque-stop face plate and the primary face plate rotating together, while the abrasive can remove nicks, gauges, and other defects. Furthermore, the refacing tool may set (or reset) proper distance between the torque-stop and primary face of the pin-end or box-end of a pipe. Similarly, the refacing tool may set or reset the torque-stop and primary face of the pin-end or box-end of a pipe to proper or suitable (e.g., parallel) orientation relative to each other.

Additional features and advantages of exemplary implementations of the invention will be set forth in the description which follows, and in part will be obvious from the description, or may be learned by the practice of such exemplary implementations. The features and advantages of such implementations may be realized and obtained by means of the instruments and combinations particularly pointed out in the appended claims. These and other features will become more fully apparent from the following description and appended claims, or may be learned by the practice of such exemplary implementations as set forth hereinafter.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. For better understanding, the like elements have been designated by like reference numbers throughout the various accompanying figures. Understanding that these drawings depict only typical embodiments of the invention and are not therefore to be considered to be limiting of its scope, the invention will be described and explained with additional specificity and detail through the use of the accompanying drawings in which:

FIG. 16A illustrates a primary face plate configured for an abrasive and FIG. 16B illustrates a primary face plate configured with cutter tips.

DETAILED DESCRIPTION

Exemplary embodiments are herein described in detail with reference to the figures.

Figure 1:
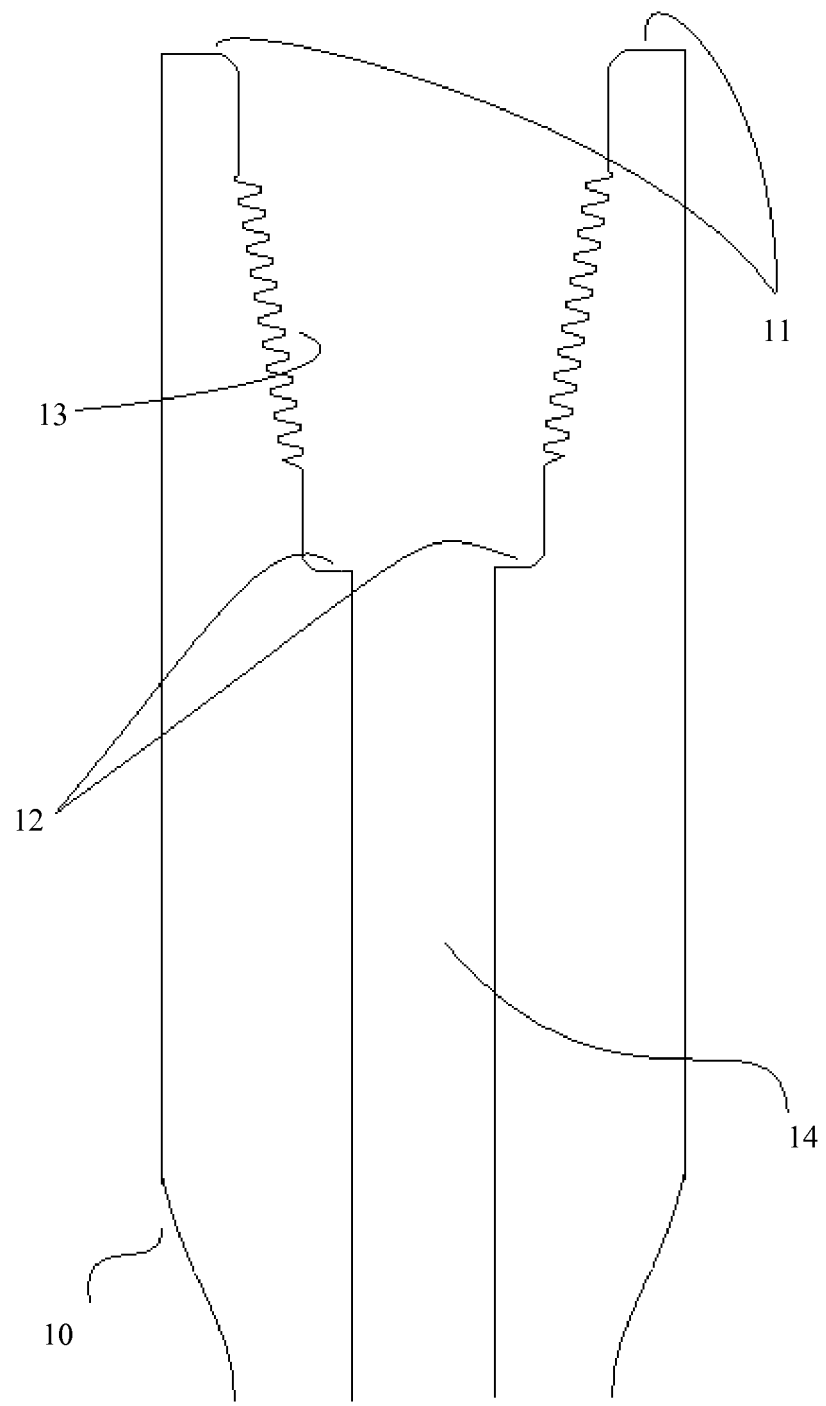
FIG. 1 illustrates a cross-sectional view of a box-end of high torque pipe.
Figure 2:
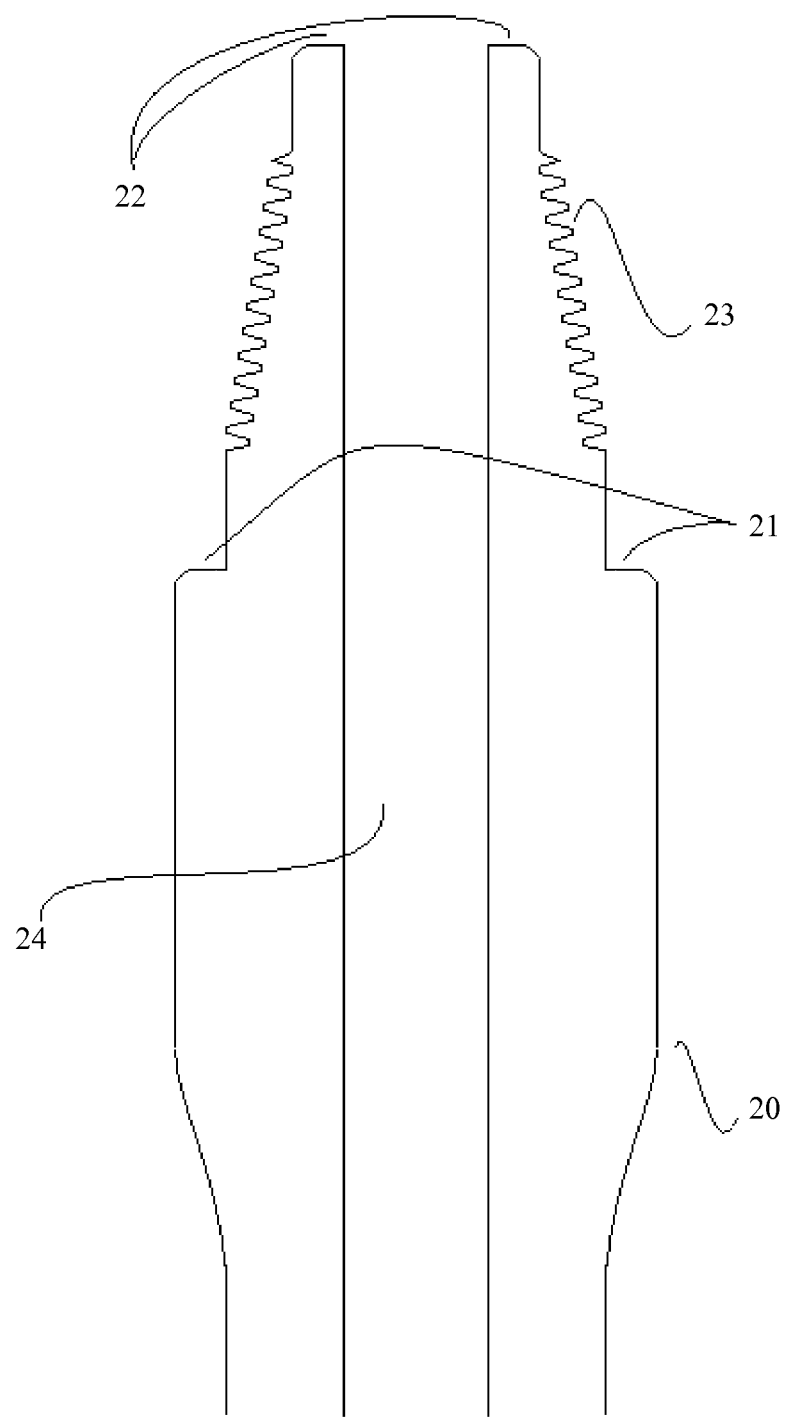
FIG. 2 illustrates a cross-sectional view of a pin-end of high torque pipe.

The apparatuses and methods described herein are for refacing the ends of high-torque pipe and bottom hole assemblies. Bottom hole assemblies refer to the equipment used below the drill pipe to drill a well. For example, bottom hole assemblies may include: drill collars, weight pipe, stabilizers, x-over subs, bit subs, reamers, drilling jars, cushion subs, directional tools, and string floats. For purposes of this specification, "pipe" refers to both drill pipe and bottom hole assembly components. FIGS. 1 and 2 illustrate the ends or connections of high-torque pipe.

FIG. 1 illustrates a box-end of a pipe tool joint 10. A "box connection" refers to the female connection on the drill pipe. The box-end has a primary face 11, a torque-stop face 12, and a threading 13. Once a connection is made, material may flow through the inner portion 14 of the pipe.

FIG. 2 illustrates a pin-end of a pipe tool joint 20. A "pin connection" refers to the male connection on the drill pipe. The pin-end has a primary face 21, a torque-stop face 22, and a threading 23. As with the box connection, once a connection is made, material may flow though the inner portion 24 of the pipe.

The refacing tools and methods according to the invention are designed to reface both the primary faces 11, 21 and torque-stop faces 12, 22 of the box and pin connections. When used, the refacing tools maintain the required length between the primary and secondary (torque-stop) faces. The length between the faces is measured and verified to be within tolerances at two points of the faces, each point being 180 degrees apart from the other. The tolerance is the difference between the two measurements. Permissible tolerances for most high torque connections are 0.005 inches or less for the box connection and 0.009 inches or less for the pin connection. The refacing tools according to the invention may maintain tolerances for the box connection of from about 0 to about 0.005 inches, such as from about 0.0005 to about 0.004 inches or about 0.001 to about 0.003 inches. The refacing tools may maintain tolerances for the pin connection of from about 0 to about 0.009 inches, such as from about 0.0005 to about 0.007 inches, or about 0.001 to about 0.005 inches. Thus, the tools provide for the redressing of the faces and ensure that the faces are sufficiently perpendicular to the axis of the threads within allowed tolerances.

Box-End Refacing Tool

Figure 3:
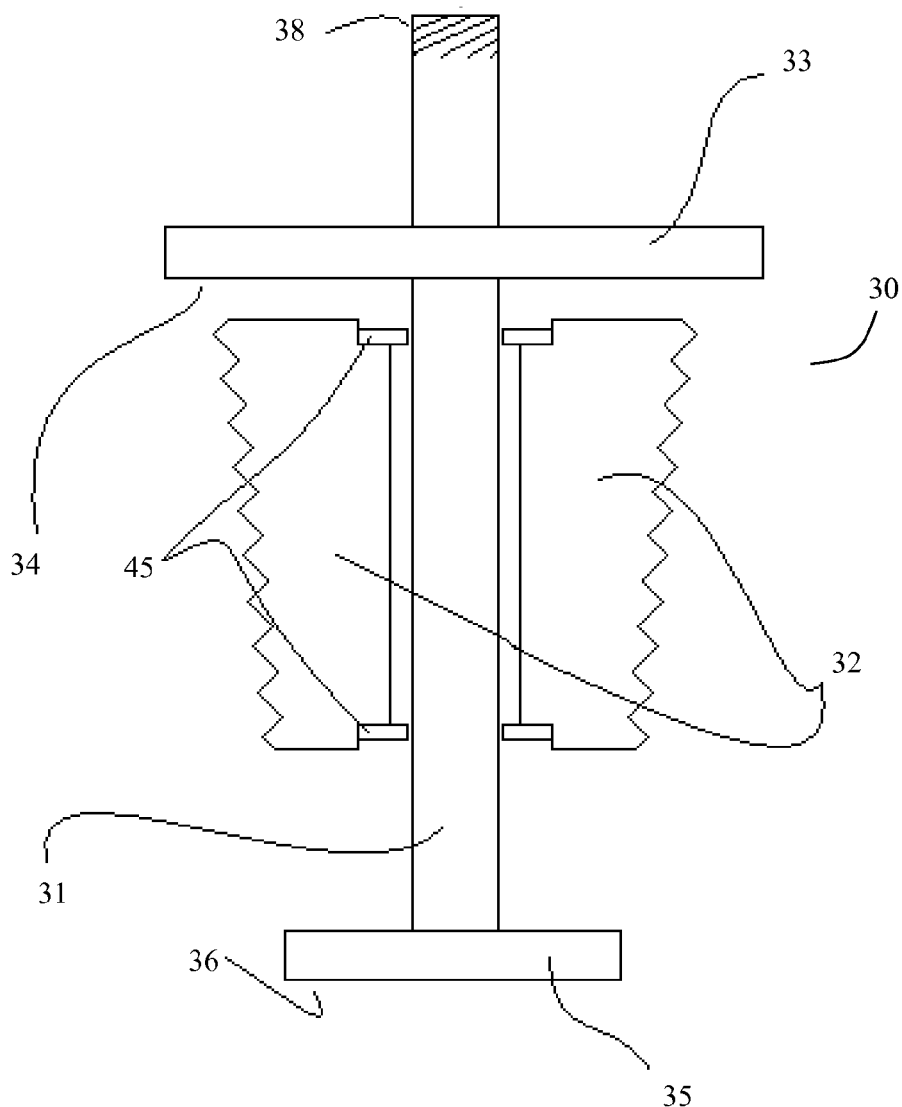
FIG. 3 illustrates a cross-sectional and exploded view of an exemplary box-end refacing tool.

FIG. 3 illustrates a cross-section of a box-end refacing tool 30. In embodiments, a box-end refacing tool 30 may include a shaft 31, primary face refacing plate 33, a torque-stop refacing plate 35, a mandrel 32, and bearings 45.

Shaft

Figure 4:
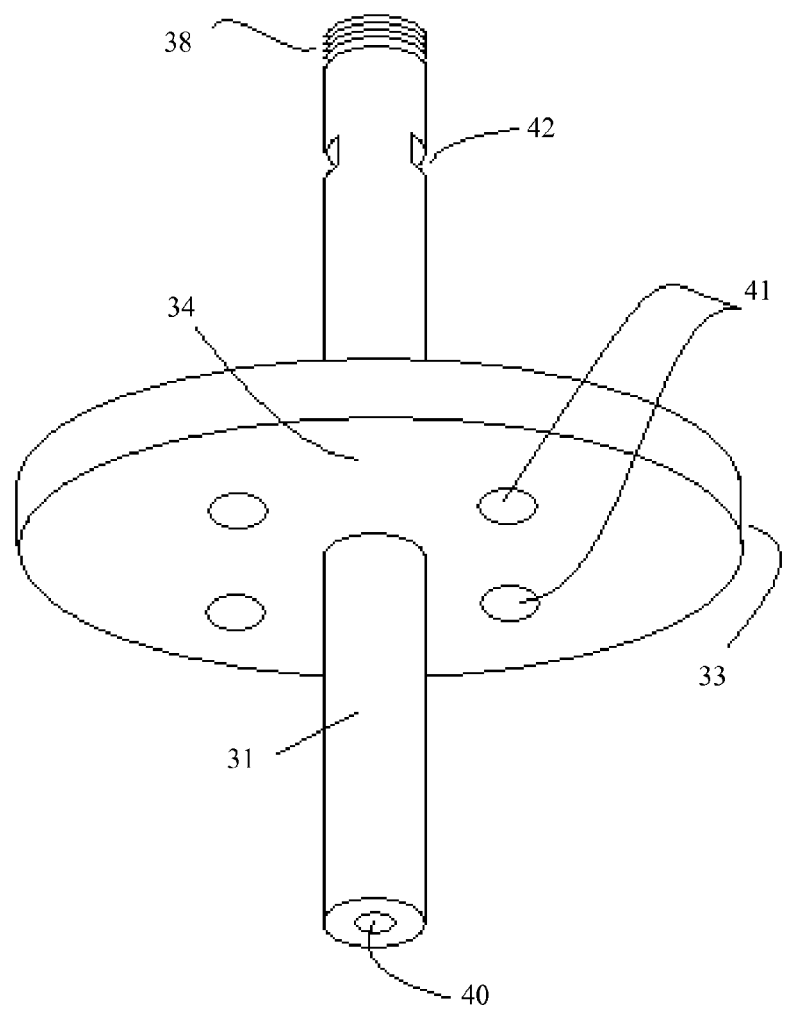
FIG. 4 illustrates an exemplary refacing plate and shaft for a box-end refacing tool.

The box-end refacing tool 30 comprises a shaft 31 as illustrated in FIGS. 3 and 4. The shaft 31 may be comprised of a metal, an alloy, or a composite suitable for driving the refacing plates. For example, the shaft 31 may be made of steel, stainless steel, aluminum, titanium, copper, brass, or metal alloy. The shaft 31 is preferably made of steel. The shaft 31 may be cylindrical to accommodate its rotation with the aid of bearings 45, but may have sections that are flattened or cubical to accommodate a wrench or other tightening tool. The shaft 31 is configured to rotate in the bearings 45 of the mandrel 32 and drive the torque-stop face plate 35 and primary face plate 33 so that the tool when screwed into the threads of a box connection 10 may reface the primary face 11 and torque-stop face 12.

The diameter and length of the shaft depends upon the type and size of the connection to be refaced. For example, a large diameter connection may require a tool with a shaft that is larger than a corresponding tool for a smaller sized connection. The shaft's diameter is sized to maintain a rigid and stable tool assembly. In embodiments, the shaft may be from about 0.5 to about 2 inches in diameter, such as from about 0.75 to about 1.5 inches, or from about 1 to about 1.25 inches.

The shaft 31 may be configured to be in one or more pieces. In the case of multiple pieces, the shaft 31 may include threadings and threaded holes whereby the pieces may be screwed into one another to form a unified body. In some embodiments, the shaft 31 is interrupted by the primary face plate 33. For example, one section of the shaft may be attached to the center of a first face of the primary face plate 33 and then another portion of the shaft may be attached to the center of the second face of the primary face plate 33.

The shaft 31 may include a threading 38, threaded hole, or chuck on one end, whereon a driver may be attached. Suitable drivers may include, for example, electric, pneumatic, or hydraulic drivers. Preferably, the driver is a portable driver that can be used in the field and may be constant or variable in speed. The driver may rotate at low or high rpm, for example, from about 650 to about 12000 rpm. Examples include a power drill, grinder, or other motorized device. For example, an 8" angle grinder or a Hole Hawg® may be attached to the threaded end 38. If using an 8" angle grinder, a ⅝ inch diameter with 11 threads per inch on the threaded end 38 will screw onto an 8" angle grinder. Any suitable threading may be used depending on the driver to be used. The shaft 31 may include a wrench slot 42, whereon a wrench may be placed for tightening the assembly onto the driver.

The shaft 31 may include a threaded hole 40, a threading, or chuck on the end opposite to the end that attaches to the driver. For example, a threaded hole 40 may be used to accept a bolt 37 that may be attached to the torque-stop face plate 35, thereby attaching the torque-stop face plate 35 to the shaft 31.

Torque-Stop Face Plate

Figure 5A:
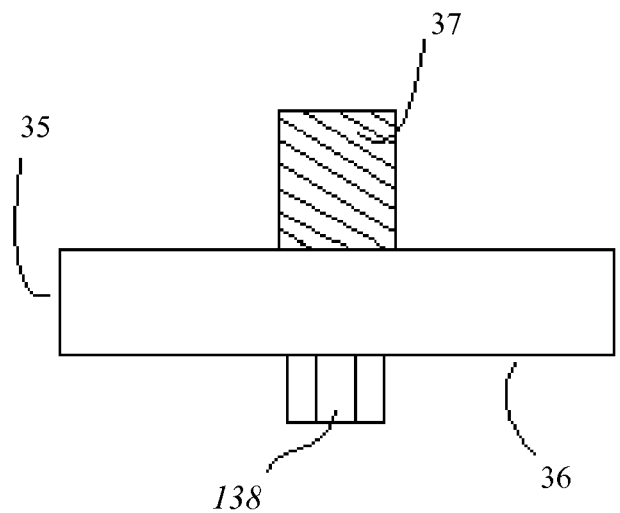
FIGS. 5A and 5B illustrate side and angled views of an exemplary torque-stop refacing plate for a box-end refacing tool.
Figure 5B:
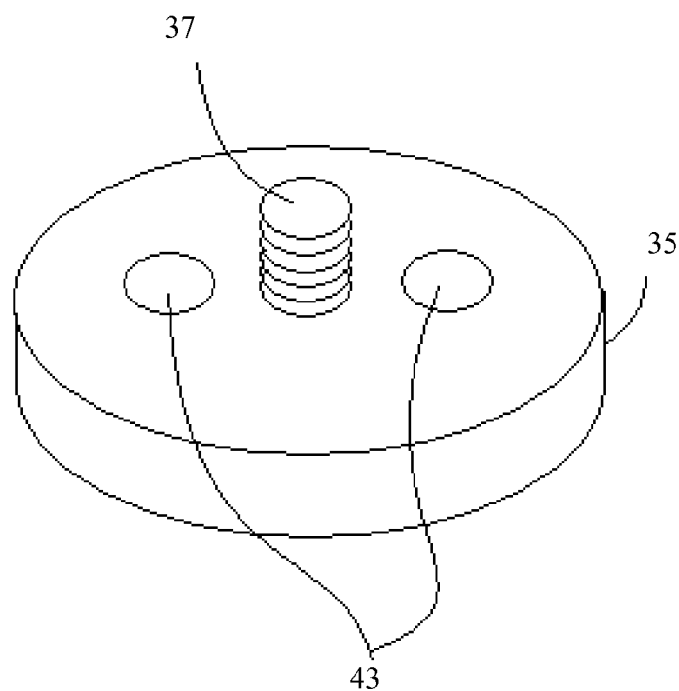

The box-end refacing tool 30 comprises a torque-stop face plate 35 as exemplified in FIGS. 5A-5B. The torque-stop face plate 35 may be comprised of a metal, an alloy, or a suitable composite. For example, the torque-stop face plate 35 may be made of steel, stainless steel, aluminum, titanium, copper, brass, or metal alloy. The torque-stop face plate 35 is preferably made of steel. The torque-stop face plate 35 is sized to correspond with the diameter of the torque-stop face 12 to be refaced, and, as such, may vary according to the target connection. The torque-stop face plate 35 is configured to rotate and engage the torque-stop face 12 of a box-end connection 10. This engagement may remove material from the torque-stop face 12 to provide for a proper length between the torque-stop face 12 and the primary face 12 and/or may smooth the torque-stop face 12 and remove irregularities, thereby providing for a proper seal within acceptable tolerances.

The torque-stop face plate 35 may be attached permanently or removably to the shaft 31. For example, the torque-stop face plate 35 may be equipped with a bolt that can screw into a threaded hole 40 in the shaft 31 to attach the torque-stop face plate 35 to the shaft 31. Similarly, the torque-stop face plate 35 may be equipped with a threaded hole that can screw into a bolt attached to an end of the shaft 31. A removable torque-stop face plate 35 facilitates the attachment and/or removal of abrasive materials (discs, stones, sandpapers, etc.) or cutters that may be attached to the abrasive surface 34 or the interchangeability of numerous torque-stop face plates 35 with different abrasive or cutting characteristics. Alternatively, the torque-stop face plate 35 may be welded to the shaft 31.

Figure 8A:
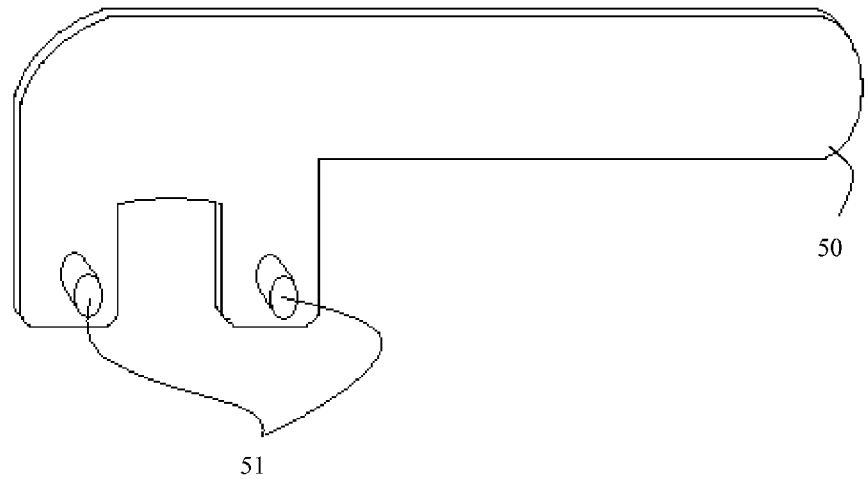
FIG. 8A illustrates an exemplary wrench for assembling a box-end refacing tool.
Figure 8B:
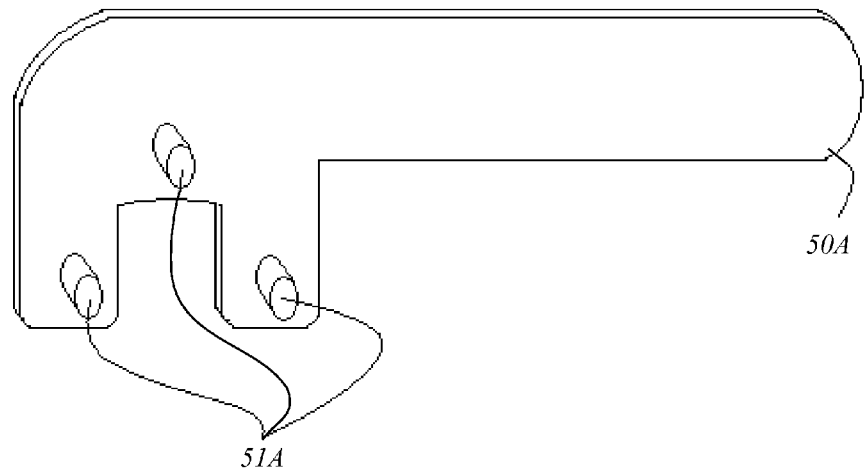
FIG. 8B illustrates another exemplary wrench for assembling a box-end refacing tool.

The torque-stop face plate 35 may include tightening holes 43, which provide an operator with a way of assembling a removable torque-stop face plate 35 to the shaft 31. The holes 43 are configured to accept a wrench 50, 50a equipped with pins 51, 51a as illustrated in FIGS. 8A-8B. A torque-stop face plate 35 may include 2, 3, 4, 5, or more holes depending on the size of the plate. The holes may be spaced at regular intervals to accept the wrench 50. Also, a nut 138, such as a hexagonal or square nut, may be attached, for example by welding, to the center of the torque-stop face plate 35 on the abrasive surface 34 face to facilitate attachment or release of the torque-stop face plate 35 from the shaft 31.

The holes 43 also may provide an exit for material that is removed during operation of the tool. In some embodiments, the torque-stop face plate 35 is configured to have a ring-shaped cutting/abrasive area and a recessed area in the center of the ring. In this configuration, the face plate contacts the torque-stop face 12 but provide a space in the center recessed area to receive removed material (filing, shavings, etc.). The torque-stop face plate 35 may also be flat.

Figure 6A:
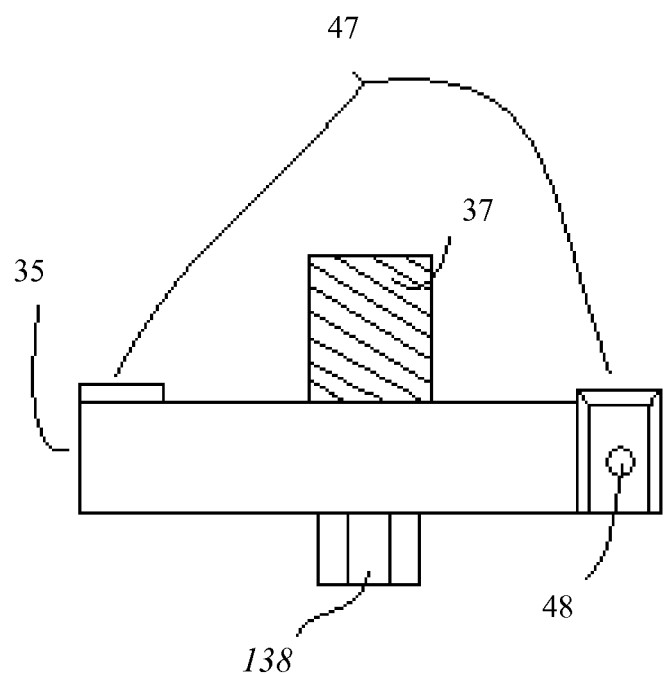
FIGS. 6A and 6B illustrate side and angled views of an exemplary torque-stop refacing plate for a box-end or pin-end refacing tool that employs cutters.
Figure 6B:
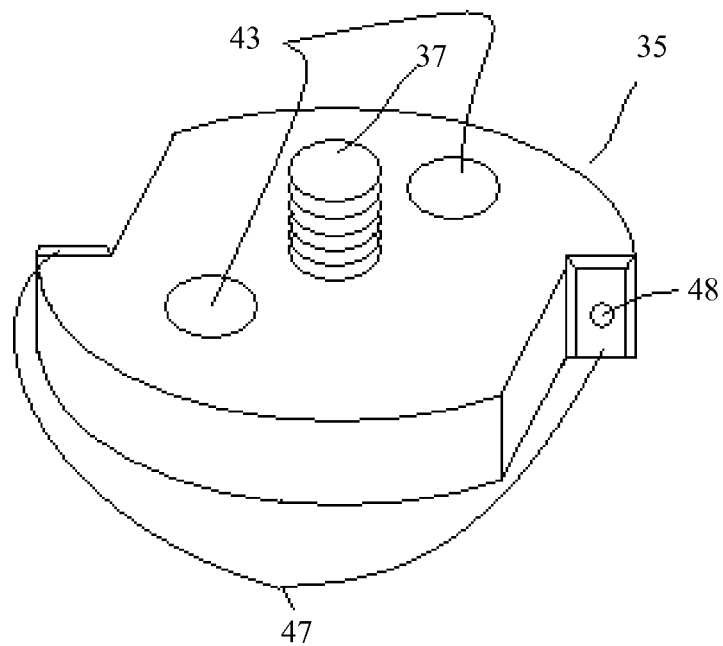

FIGS. 6A-6B illustrate an exemplary configuration for a torque-stop face plate 35 that employs cutter tips 47. Such a face plate may include the same features as the above described face plate, for example, it may include a bolt 37, a nut 138, and holes 43. The cutter tips 47 may be permanently or removably attached to the face plate 35 by a bolt or nut, such as a hex-nut inserted into a tapped hole 48. In embodiments 1 or more cutter tips 47 may be used. For each cutter tip, an appropriate machine taper is configured or wedge is removed on the face plate 35 to accommodate the cutter tip 47.

Primary Face Plate

The box-end refacing tool 30 comprises a primary face plate 33 as exemplified in FIGS. 3 and 4. The primary face plate 33 may be comprised of a metal, an alloy, or a suitable composite. For example, the primary face plate 33 may be made of steel, stainless steel, aluminum, titanium, copper, brass, or metal alloy. The primary face plate 33 is preferably made of steel. The primary face plate 33 is sized to correspond with the diameter of the primary face 11 to be refaced. The primary face plate 33 is configured to rotate and engage the primary face 11 of a box-end connection 10. This engagement may remove material from the primary face 11 to provide for a proper length between the torque-stop face 12 and the primary face 11 and/or may smooth the primary face 11 and remove irregularities, thereby providing for a proper seal within acceptable tolerances.

The primary face plate 33 may be attached permanently or removably to the shaft 31. For example, the primary face plate 33 may be welded to the shaft at a point between the ends of the shaft 31. Alternatively, the primary face plate 33 may be configured with a bolt, threading, or threaded hole at the center point of one or both sides to accept a split shaft conformation where the primary face plate 33 is located a point in between driver and the torque-stop face plate 35.

The primary face plate 33 may include tightening holes 41, which provide an operator with a way of assembling the components of the box-end refacing tool 30. The holes 41 are configured to accept a wrench 50, 50a equipped with pins 51, 51a as illustrated in FIGS. 8A-8B. A primary face plate 33 may include 2, 3, 4, 5, or more holes depending on the size of the plate. The holes may be spaced at regular intervals to accept the wrench 50.

In some embodiments, the primary face plate 33 may be configured to have a ring-shaped cutting/abrasive area and a recessed area in the center of the ring. The primary face plate 33 may also be flat.

In other embodiments, the primary face plate 33 may be configured to accept cutting tips, such as is illustrated for a torque-stop face plate 35 in FIGS. 6A-6B.

Abrasives and Cutters

The torque-stop face plate 35 and the primary face plate 33, as illustrated in FIGS. 4 and 5 have abrasive surfaces 36, 34, respectively. The abrasive surfaces 36, 34 may be equipped with a removable or permanent abrasive. Any suitable abrasive substance capable of removing material from the torque-stop face 12 and primary face 11 by rotation of the torque-stop face plate 35 and primary face plate 33 may be used.

Removable abrasive discs or rings, grinding stones, or other abrasives may be attached to the surfaces 34, 36 by any suitable attaching means. For example, an abrasive disc may be attached by, for example, an adhesive. Other attaching means include, for example, nails, bolts, screws, and cements. The attaching means is preferably configured to resist heat generated during operation of the tool. A suitable removable abrasive includes, for example a 36 grit PSA (pressure sensitive adhesive) abrasive disc.

Permanent abrasives may also be used. For example, the abrasive surfaces 36, 34 may be coated with diamond coatings, powder coated abrasives, or any other suitable permanent abrasive composition or material.

In embodiments, abrasives also include cutters and cutter tips. The plates may be configured to accept cutter tips, such as tungsten carbide cutters or ceramic cutters. FIGS. 6A-6B illustrate a torque-stop face plate configured to accept cutters. A primary face plate may be similarly configured to accept cutters. In embodiments, the face plates may be configured to have 1 or more cutters, such as from about 1 to about 10, from about 2 to about 8, or from about 3 to about 5. The number of cutter tips employed may depend on the size of the connection to be refaced and the amount of material to be removed. The cutter tips may be mounted to the face plates via a screw or bolt, such as a hex nut.

The cutter tips may be equipped with one or more cutting edges, such as, for example, 8 cutting edges. As the tool is used and the cutter tips dull, the cutter tips may be replaced or removed from the plate and rotated (indexed) to expose a new cutting edge. The cutter tips are also configured to engage the face to be refaced at any angle sufficient to remove material, for example, an angle of 1° or more, such as from about 2° to about 10°, from about 3° to about 7°, or from about 4° to about 6° may be used. The angle is measured with a reference angle of 0° being when a cutter tip on its end is perpendicular to the plane of the face to be refaced or, in other words, parallel with the direction of the axis the threads 13 of the box connection 10.

The type of abrasive or cutter used on the torque-stop face plate 63 and the primary face plate 65 may be the same or different, depending on the refacing that a target connection requires. Also, multiple abrasives and/or cutters may be used in sequence to reface the connection. For example, a cutter may be employed initially to remove material and then an abrasive disc may be used to further smooth and shine the same face.

Mandrel

Figure 7:
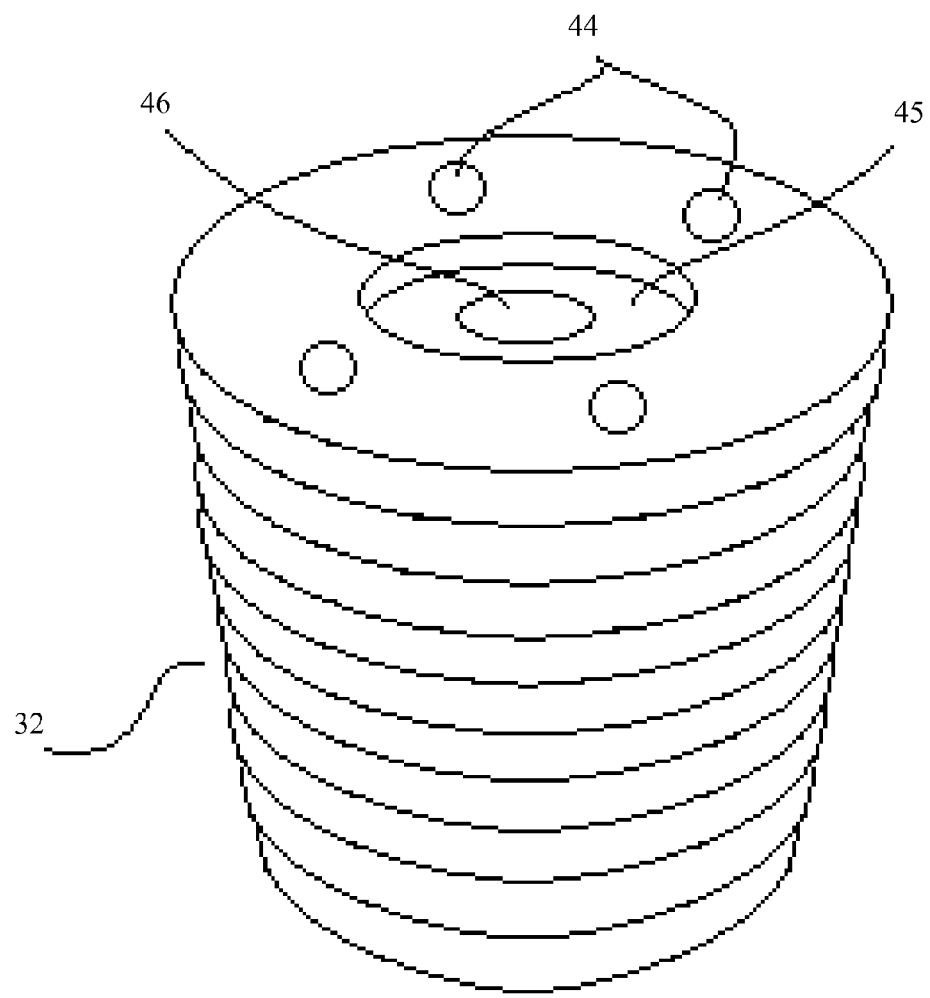
FIG. 7 illustrates an exemplary mandrel for a box-end refacing tool.

The box-end refacing tool 30 also comprises a mandrel 32 as exemplified in FIGS. 3 and 7. The mandrel 32 may be comprised of a metal, an alloy, or a suitable composite. For example, the mandrel 32 may be made of steel, stainless steel, aluminum, titanium, copper, brass, metal alloy, plastic composite, polymer composite, or carbon fiber composite. The mandrel 32 is preferably made of steel. The mandrel 32 is configured to screw into the threads 13 of the box-end connection 10 thereby attaching the tool 30 to the box-end connection 10 while maintaining a perpendicular orientation of the torque-stop face plate 35 and primary face plate 33 with the direction of the axis of the threads 13 of the box-end connection 10.

The mandrel 32 is configured to be inserted into a box-end connection 10 and held in place by screwing it into the threads 13 of the box-end connection 10. The mandrel 32 may vary in size, depending on the size of connection to be refaced. Because box-end connections 10 typically have tapered threads 13, the mandrel 32 may be configured with tapered threads. Here again, the threads may vary in size depending on the connection to be refaced. The mandrel 32 is thus configured with a corresponding thread form, threads per inch, and taper to that of the target box-end connection 10, thereby ensuring that the shaft 31, which runs through the center of the mandrel 32 via a center hole 46 is parallel to the axis of the connection threads 13.

The cylindrical center hole 46 may be configured with one or more bearings 45 to facilitate the rotation of the torque-stop face plate 35 and primary face plate 33 driven by the shaft 31. The mandrel 32 ensures that the face plates reface the torque-stop face 12 and primary face 11 substantially perpendicular to the axis and direction of the threads 13 of the box-end connection 10 to be refaced.

The mandrel 32 may include tightening holes 44 on one end, which provide an operator with a way of screwing and tightening the mandrel 32 into the box-end connection 10, thus providing for the assembly of the components of the box-end refacing tool 30 within the box-end connection 10. The holes 41 are configured to accept a wrench 50, 50*a* equipped with pins 51, 51*a* as illustrated in FIG. 8A-8B. A mandrel 32 may include 2, 3, 4, 5, or more holes depending on the size of the connection to be refaced. The holes may be spaced at regular intervals to accept the wrench 50.

Pin-End Refacing Tool

Figure 9:
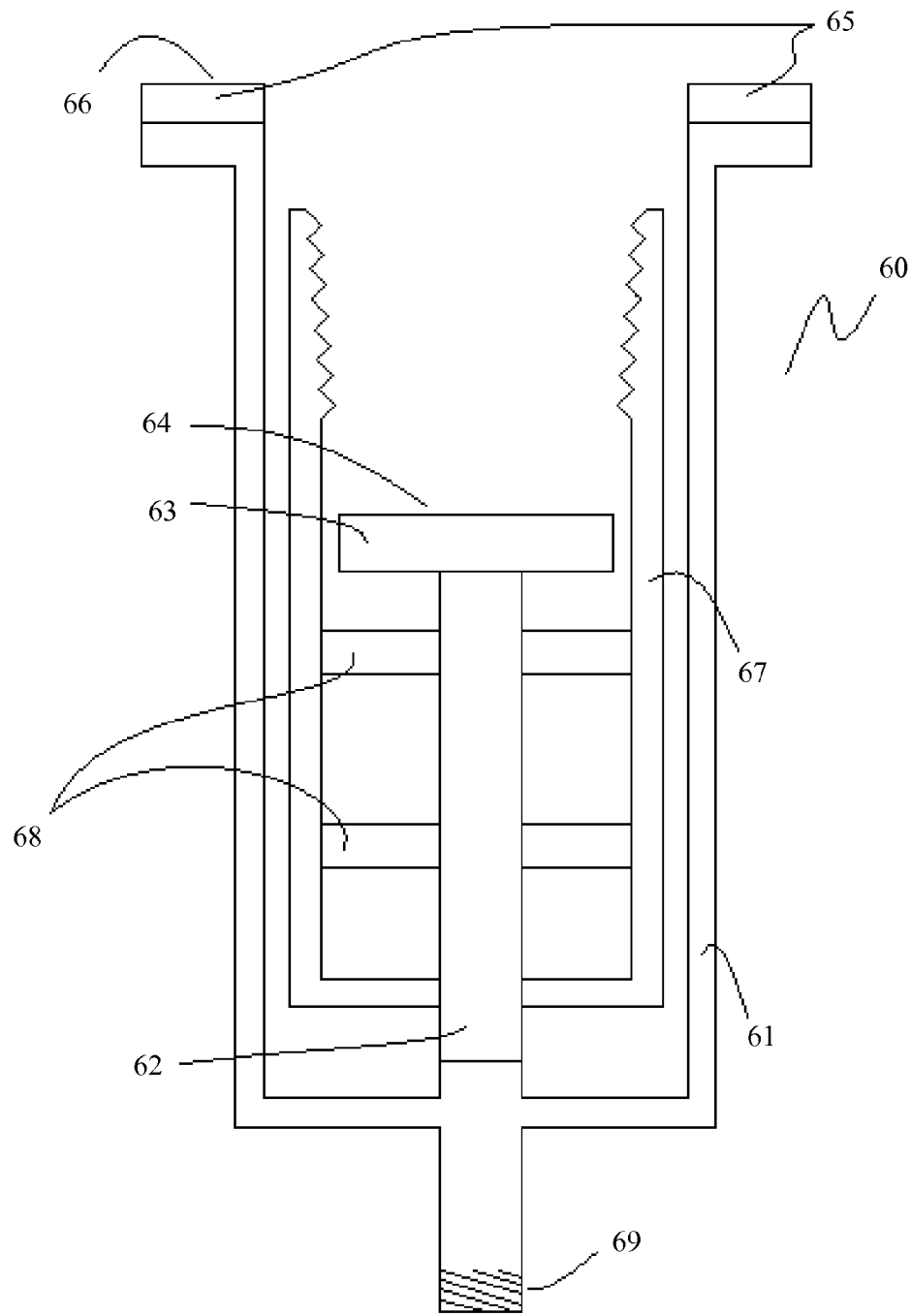
FIG. 9 illustrates a cross-sectional view of an exemplary pin-end refacing tool.

In another embodiment according to the invention and illustrated in FIG. 9, a pin-end refacing tool 60 may comprise a barrel 61, a shaft 62, a torque-stop refacing plate 63, a primary refacing plate 65, a mandrel 67, and bearings 68.

Barrel

Figure 10A:
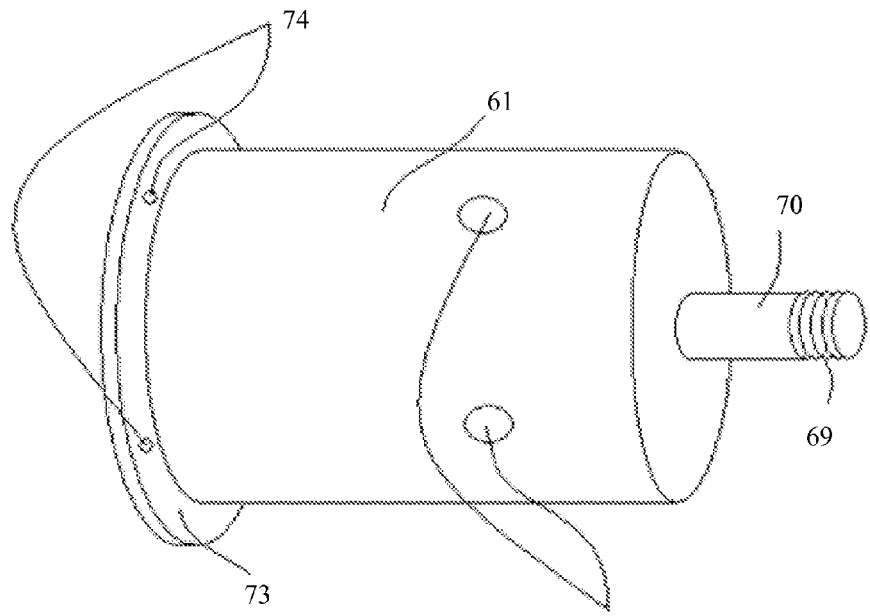
FIGS. 10A and 10B illustrate angled and bottom views of an exemplary barrel for a pin-end refacing tool.

The pin-end refacing tool 60 comprises a barrel 61 as exemplified in FIGS. 9 and 10. The barrel 61 may be comprised of a metal, an alloy, or a suitable composite. For example, the barrel 61 may be made of steel, stainless steel, aluminum, titanium, copper, brass, metal alloy, plastic composite, polymer composite, or carbon fiber composite. The barrel is preferably made of aluminum.

The barrel 61 is configured to rotate with the shaft 62, which rotates on bearings 68, and thereby simultaneously transfer rotational motion to the primary face plate 65 and torque-stop face plate 63.

The barrel 61 may vary in size depending on the size of the connection to be refaced. The diameter of the barrel 61 is large enough to fit over the mandrel 67, which screws onto the pin-end 20 of the pipe. Thus, the inner diameter of the barrel 61 is configured to be larger than the outermost diameter of the mandrel 67, thus allowing the barrel 61 to slip over and rotate around the mandrel 67. For example, the inner diameter of the barrel 61 may be from about 0.0625 to about 5 inches larger than the outermost diameter of the mandrel 67, such as from about 0.125 to about 3 inches, or from about 0.25 to about 2 inches.

The barrel 61 may include a rim 73, which may include fastening holes 74 to facilitate the fastening of the primary refacing plate 65 to the rim 73 of the barrel 61. The rim 73 is sized to correspond with the primary face 21 of the pin-end connection 20 to be refaced. The rim 73 may be configured to provide a base whereon the primary face plate 65 may engage the primary face 21 of the pin-end connection 20 with an abrasive or cutter, thereby removing material and refacing the face 21.

The top of the barrel 61 includes a driving shaft 70, the end of which may include a threading 69 or chuck on one end, whereon a driver may be attached. The driver may be the same as or different than the driver described above for the box-end refacing tool. For example, an 8" angle grinder or a Hole Hawg® may be attached to the threaded end 69. As with box-end refacing tool, any suitable threading may be used depending on the driver to be used. The driving shaft 70 may be cylindrical or cubical. The driving shaft 70 may be from about 0.5 to about 2 inches in diameter, such as from about 0.75 to about 1.5 inches, or from about 1 to about 1.25 inches. The drive shaft 70 may include a wrench slot, whereon a wrench may be placed for tightening the assembly onto the driver. The driving shaft 70 may be permanently or removably attached. For example, the driving shaft 70 may be welding or forged to the barrel 61. Alternatively, the driving shaft 70 may be bolted to or configured to screw into the barrel 61 or to have the barrel 61 screw into the driving shaft 70.

Figure 10B:
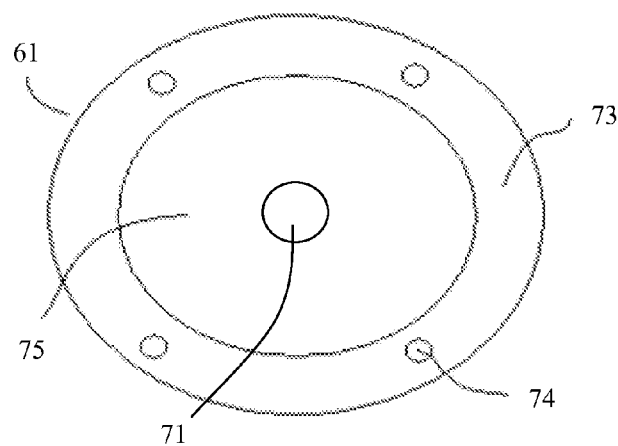

The interior of the barrel 75 may be configured with a threaded hole 71, threading, or other attachment point as illustrated in FIG. 10B whereby the shaft 62 may be attached to the barrel 61.

Figure 19:
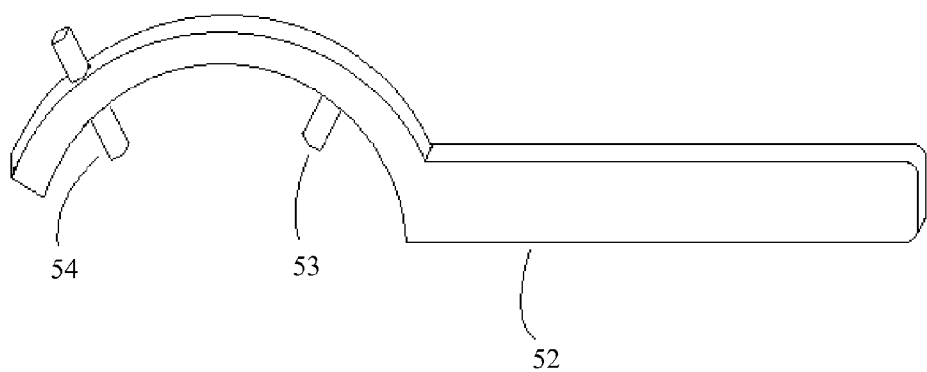
FIG. 19 illustrates an exemplary wrench for assembling a pin-end refacing tool on to a pin-end connection to be refaced.

The barrel 61 may include tightening holes 72 on its side wall, which provide an operator with a way of assembling the components of the pin-end refacing tool 60 and of screwing and tightening the mandrel onto the pin-end connection 20 to be refaced. The holes 72 are configured to accept a wrench 52 equipped with pins 53, 54 as illustrated in FIG. 19. One of the pins 54 may be spring loaded to permit the wrench 52 to latch onto the curved side wall. The barrel 61 may include 2, 3, 4, 5, or more holes depending on the size of the connection to be refaced and the corresponding size of the barrel. The holes may be spaced at regular intervals to accept the wrench 52.

Cap and Sleeve

In another embodiment, the barrel 61 may be split into a cap 76 and barrel sleeve 77 as illustrated in FIGS. 11, 12A-13B. The cap 76 and barrel sleeve 77 may each be comprised of a metal, an alloy, or a suitable composite. For example, the cap 76 and barrel sleeve 77 may be made of steel, stainless steel, aluminum, titanium, copper, brass, metal alloy, plastic composite, polymer composite, or carbon fiber composite. The cap 76 and barrel sleeve 77 may be made of different materials. The cap 76 is preferably made of steel and barrel sleeve 77 is preferably made of aluminum.

In the illustrated configuration, the threads 85 on the interior of the cap 76 screw onto the threads 80 of the barrel sleeve 77; however, the cap 76 could also be configured to screw into the sleeve 77. The cap 76 and barrel sleeve 77 are configured to screw together and make a face-to-face connection, thus ensuring that the cap 76 and barrel sleeve 77 are in line with one another. In other words, once the cap 76 and barrel sleeve 77 are screwed together, there exists a face-to-face connection as opposed to only a thread-to-thread connection.

Figure 12A:
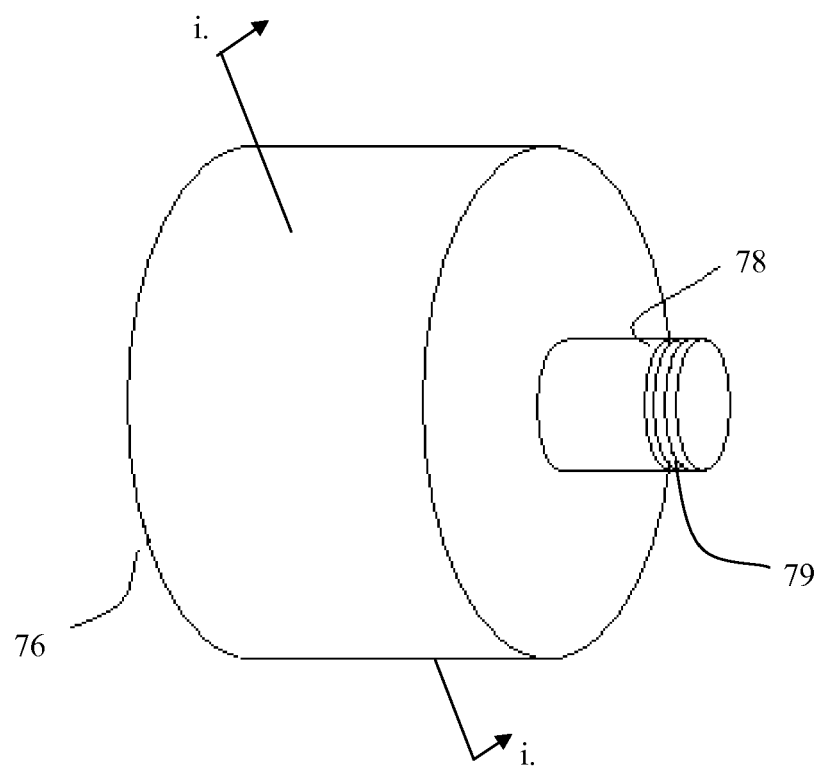
FIGS. 12A and 12B illustrate angled and cross-sectional views of an exemplary barrel cap for a pin-end refacing tool.
Figure 12B:
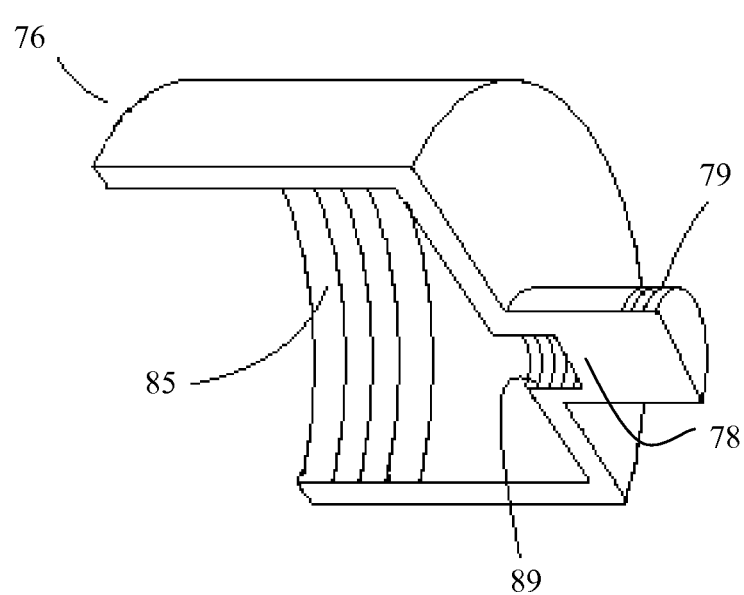
Figure 13A:
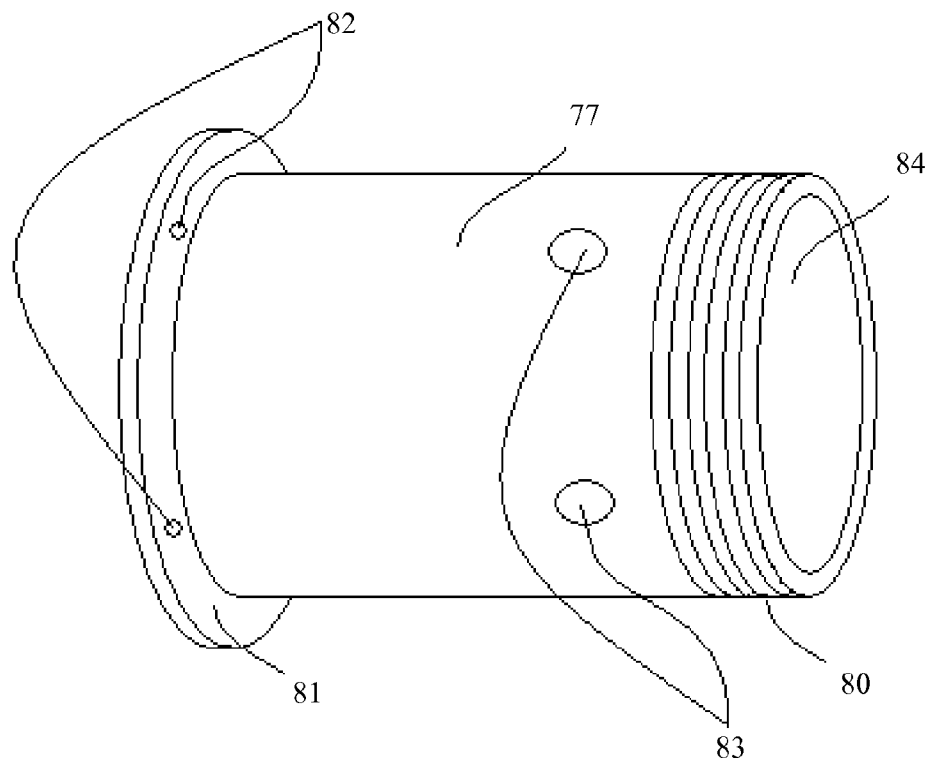
FIGS. 13A and 13B illustrate angled and bottom views of an exemplary barrel sleeve for a pin-end refacing tool.
Figure 13B:
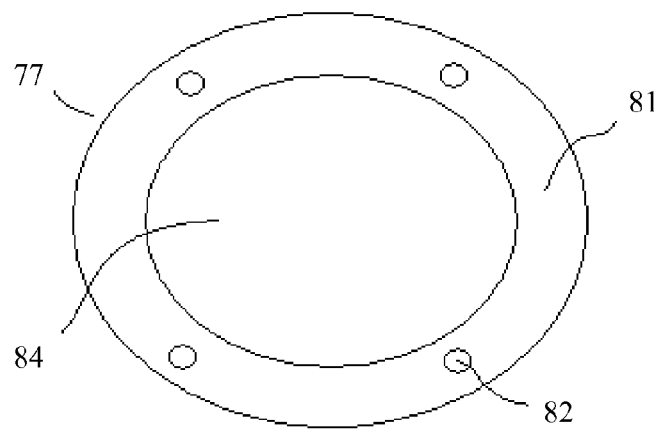

The cap 76 corresponds with the top portion of the barrel 61 in the previously described embodiment and may be configured to have the same features as described above. For example, as in the above embodiment, the driving shaft 78 may be permanent or removable and the threaded end 79 may be configured to attach to a driver, such as a portable driver. FIGS. 12A-12B also illustrate an attachment threading 89, where the shaft 62 may be screwed into the cap. The barrel sleeve 77 corresponds with the body of the barrel 61 and may also have the same features as described above. For example, the barrel sleeve 77 may include a rim 73 for bolting the primary face plate 65 onto the barrel sleeve 77 and tightening holes 83.

Shaft

Figure 14:
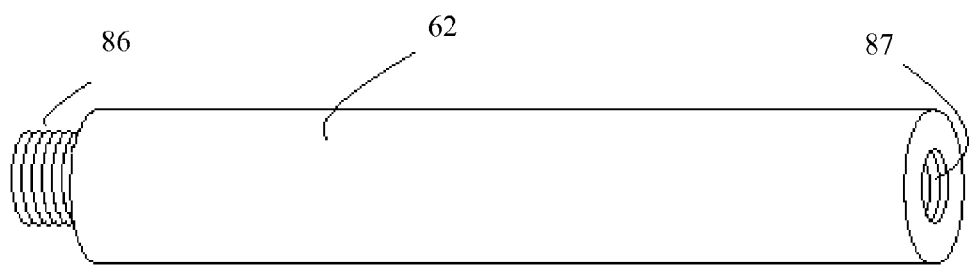
FIG. 14 illustrates an exemplary shaft for a pin-end refacing tool.

The pin-end refacing tool 60 comprises a shaft 62 as illustrated in FIGS. 9, 10, and 14. The shaft 62 may be comprised of a metal, alloy, or a suitable composite. For example, the shaft 62 may be made of steel, stainless steel, aluminum, titanium, copper, brass, or a metal alloy. The shaft 62 is preferably made of steel. The shaft 31 may be cylindrical to accommodate its rotation with the aid of bearings, but may have sections that are flattened or cubical to accommodate a wrench or other tightening tool. The shaft 62 is configured to rotate within the mandrel 67 on bearings 68 and drive the torque-stop face plate 63 so that the tool when screwed onto the threads of a pin-end connection 20 may reface the primary face 21 and torque-stop face 22 simultaneously.

The diameter and length of the shaft 62 depends upon the type and size of the connection to be refaced. For example, a large diameter connection may require a tool with a shaft that is larger than a corresponding tool for a smaller diameter pipe. The shaft's diameter is sized to maintain a rigid and stable tool assembly. In embodiments, the shaft may be from about 0.5 to about 2 inches in diameter, such as from about 0.75 to about 1.5 inches, or from about 1 to about 1.25 inches.

The shaft 62 may be configured to be in one or more pieces. In the case of multiple pieces, the shaft 62 may include threadings and threaded holes whereby the pieces may be screwed into one another to form a unified body.

The shaft 62 may be permanently or removably attached to the barrel 61 and/or cap 76. When removably attached, the shaft 62 may include a threading 86, threaded hole, or chuck on one end, to attach to a corresponding threading, hole (71, 89 of FIGS. 10B and 12B), bolt, chuck, etc. The shaft 62 may include a threaded hole 87, a threading, or chuck on the end opposite to the end that attaches to the barrel 61 and/or cap 76. The shaft 62 may include a wrench slot. The torque-stop face plate 63 may thereby be attached to the shaft 62 via a corresponding attachment point on the torque-stop face plate 63. For example, a threaded hole 87 may be used to accept a bolt 90 that may be attached to the torque-stop face plate 63, thereby attaching the torque-stop face plate 63 to the shaft 62.

Torque-Stop Face Plate

Figure 15A:
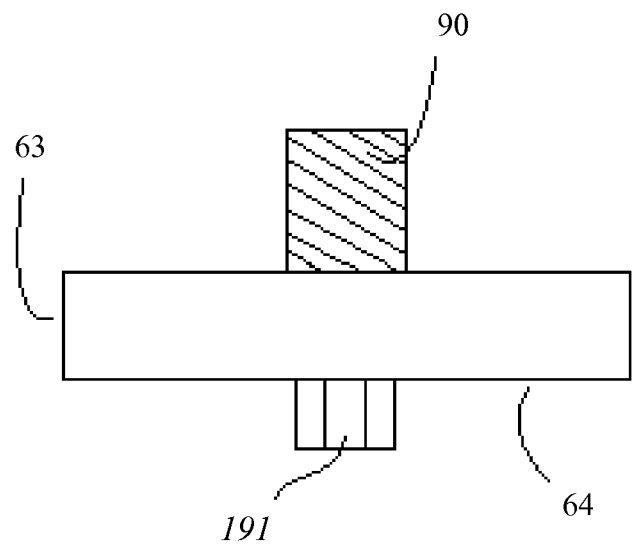
FIGS. 15A and 15B illustrate side and angled views of an exemplary torque-stop face plate for a pin-end refacing tool.
Figure 15B:
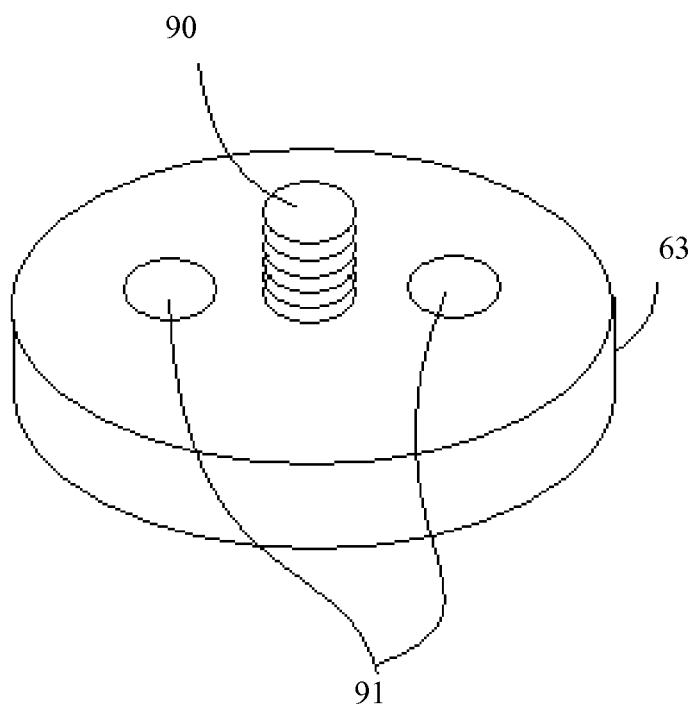

The pin-end refacing tool 60 comprises a torque-stop face plate 63 as exemplified in FIGS. 15A-15B. The torque-stop face plate 63 may be comprised of a metal, an alloy, or a suitable composite. For example, the torque-stop face plate 63 may be made of steel, stainless steel, aluminum, titanium, copper, brass, or a metal alloy. The torque-stop face plate 63 is preferably made of steel. The torque-stop face plate 63 is sized to correspond with the diameter of the torque-stop face 22 to be refaced and, as such, may vary in size according to the target connection. The torque-stop face plate 63 is configured to rotate and engage the torque-stop face 22 of a pin-end connection 20. This engagement may remove material from the torque-stop face plate 63 to provide for a proper length between the torque-stop face 22 and the primary face 21 and/or may smooth the torque-stop face 22 and remove irregularities, thereby providing for a proper seal within acceptable tolerances.

The torque-stop face plate 63 may be attached permanently or removably to the shaft. For example, the torque-stop face plate 63 may be equipped with a bolt 90 that can screw into a threaded hole 87 in the shaft 62 to attach the torque-stop face plate 63 to the shaft 62. Similarly, the torque-stop face plate 63 may be equipped with a threaded hole that can screw into a bolt attached to an end of the shaft 62. A removable torque-stop face plate 63 facilitates the attachment and/or removal of abrasive materials (discs, stones, sandpapers, etc.) or cutters that may be attached to the abrasive surface 64 or the interchangeability of numerous torque-stop face plates 63 with different abrasive or cutting characteristics. Alternatively, the torque-stop face plate 63 may be welded to the shaft 62.

The torque-stop face plate 63 may include tightening holes 91, which provide an operator with a way of assembling a removable torque-stop face plate 63 to the shaft 62. The holes 91 are configured to accept a wrench 50, 50*a* equipped with pins 51, 51*a* as illustrated in FIGS. 8A-8B. A torque-stop face plate 63 may include 2, 3, 4, 5, or more holes depending on the size of the plate. The holes may be spaced at regular intervals to accept the wrench 50. Also, a nut 191, such as a hexagonal or square nut, may be attached, for example by welding, to the center of the torque-stop face plate 63 on the abrasive surface 64 face to facilitate attachment or release of the torque-stop face plate 63 from the shaft 62.

The torque-stop face plate 63 may be configured to accept either an abrasive or cutter tips. For example, the torque-stop face plate 63 may be configures as is illustrated in FIGS. 15A-15B for an abrasive or, alternatively, may be configured as illustrated in FIGS. 6A-6B for the box-end torque stop face plate 35 with cutting tips.

Primary Face Plate

The pin-end refacing tool 60 comprises a primary face plate 65 as exemplified in FIGS. 9, 10, and 16A-16B. The primary face plate 65 may be comprised of a metal, an alloy, or a suitable composite. For example, the primary face plate 65 may be made of steel, stainless steel, aluminum, titanium, copper, brass, or metal alloy. The primary face plate 65 is preferably made of steel. The primary face plate 65 is ring-shaped and sized to correspond with the diameter of the primary face 21 to be refaced. The primary face plate 65 is configured to rotate and engage the primary face 21 of a pin-end connection 20. This engagement may remove material from the primary face 21 to provide for a proper length between the torque-stop face 22 and the primary face 21 and/or may smooth the primary face 21 and remove irregularities, thereby providing for a proper seal within acceptable tolerances.

The primary face plate 65 may be attached permanently or removably to the barrel 61 or sleeve 77. For example, the primary face plate 65 may be welded to the barrel 61 or sleeve 77. Alternatively, the primary face plate 65 may be attached to the rim 81 of the barrel 61 or sleeve 77 via fasteners, for example bolts, screws, rivets, nails, or an adhesive. The rim 81 may be configured to have holes 82 to facilitate attachment of the primary face plate 65.

Figure 16A:
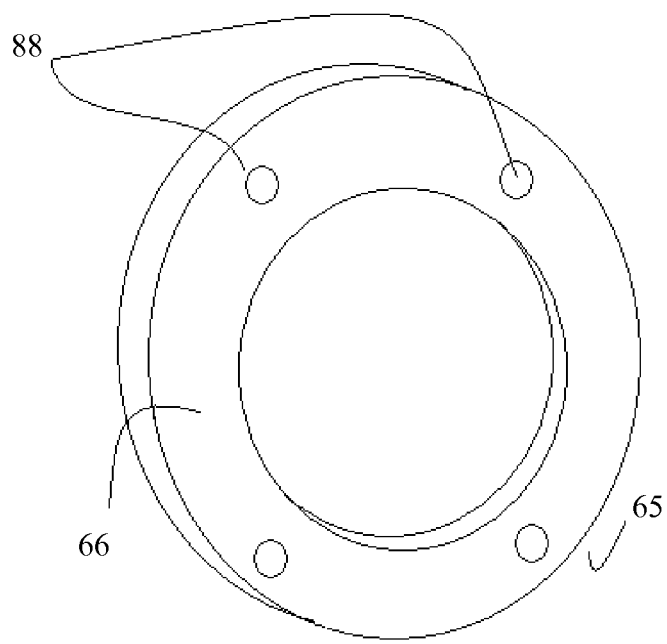
FIGS. 16A and 16B illustrate exemplary primary face plates for a pin-end refacing tool.
Figure 16B:
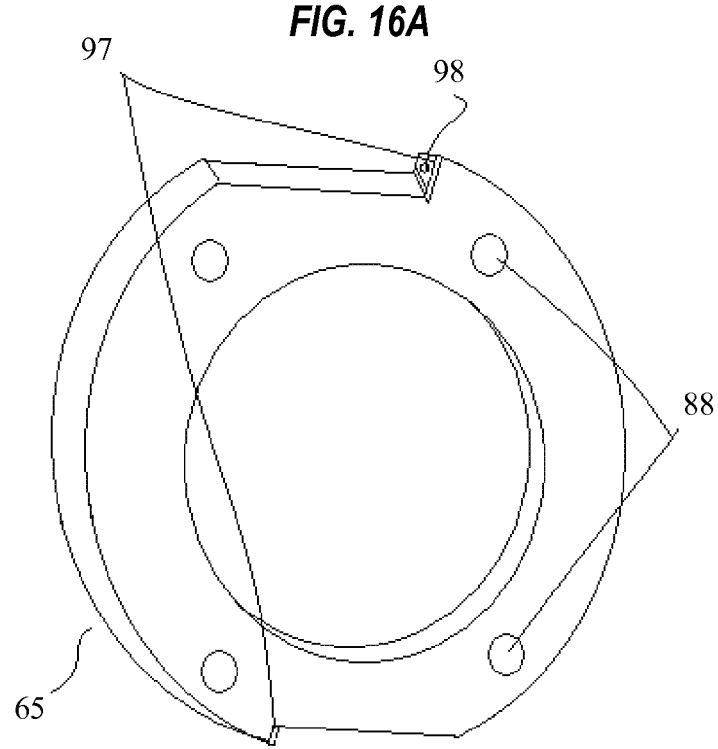
Figure 17:
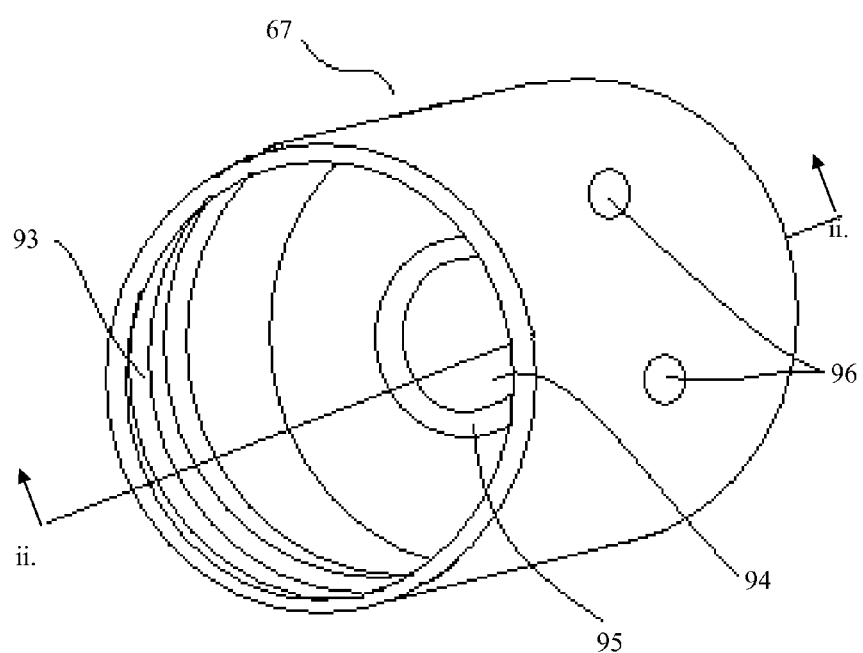
FIG. 17 illustrates an exemplary mandrel for a pin-end refacing tool.
Figure 18:
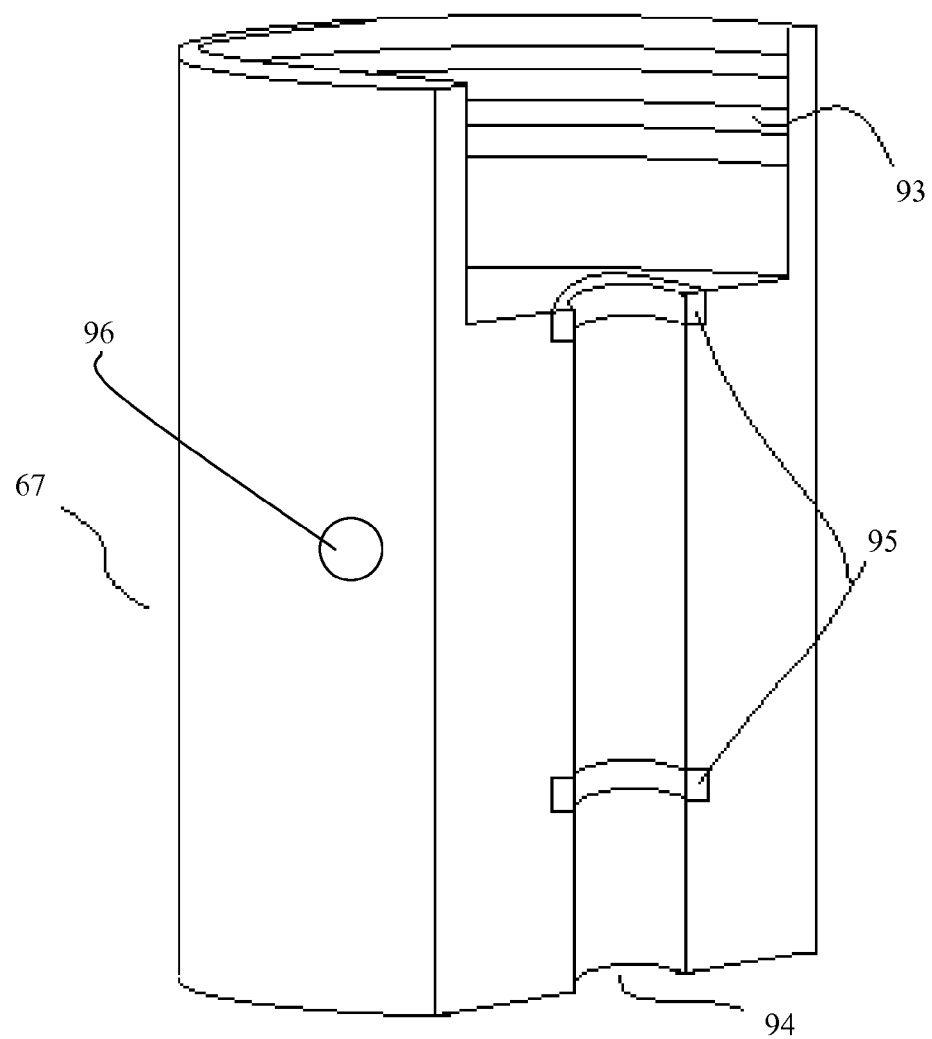
FIG. 18 illustrates a cross-section of an exemplary mandrel for a pin-end refacing tool.

The primary face plate 65 illustrated in FIG. 16A is configured to accept an abrasive. The primary face plate 65 illustrated in FIG. 16B is configured to accept cutter tips 97. The cutter tips 97 may be permanently or removably attached to the face plate 65 by a bolt or nut, such as a hex-nut inserted into a tapped hole 98. As with the other face plates described above, the primary face plate 65 may have 1 or more cutter tips 97. For each cutter tip 97, an appropriate machine taper is configured or wedge us removed on the face plate 65 to accommodate the cutter tip 97.

Abrasives and Cutters

The torque-stop face plate 63 and the primary face plate 65, as illustrated in FIGS. 15A-16A have abrasive surfaces 64, 66, respectively. The abrasive surfaces 64, 66 may be equipped with a removable or permanent abrasive. Any suitable abrasive substance capable of removing material from the torque-stop face 12 and primary face 11 by rotation of the torque-stop face plate 35 and primary face plate 33 may be used.

Removable abrasive discs or rings, grinding stones, or other abrasives may be attached to the surfaces 64, 66 by any suitable attaching means. For example, an abrasive disc may be attached by, for example, an adhesive. Other attaching means include, for example, nails, bolts, screws, and cements. The attaching means is preferably configured to resist heat generated during operation of the tool. A suitable removable abrasive includes, for example a 36 grit PSA (pressure sensitive adhesive) abrasive disc.

Permanent abrasives may also be used. For example, the abrasive surfaces 64, 66 may be coated with diamond coatings, powder coated abrasives, or any other suitable permanent abrasive composition or material.

In embodiments, abrasives also include cutters and cutter tips. The plates may be configured to accept cutter tips, such as tungsten carbide cutters or ceramic cutters. FIGS. 6 and 16B illustrate face plates configured to accept cutter tips. In embodiments, the face plates may be configured to have 1 or more cutters, such as from about 1 to about 10, from about 2 to about 8, or from about 3 to about 5.

The number of cutter tips employed may depend on the size of the connection to be refaced and the amount of material to be removed. The cutter tips are mounted to the face plates via a screw or bolt, such as a hex nut. The cutter tips may be equipped with one or more cutting edges, such as, for example, 8 cutting edges. As the tool is used and the cutter tips dull, the cutter tips may be replaced or removed from the plate and rotated (indexed) to expose a new cutting edge. The cutter tips are also configured to engage the face to be refaced at any angle sufficient to remove material, for example, an angle of 1° or more, such as from about 2° to about 10°, from about 3° to about 7°, or from about 4° to about 6° may be used. The angle is measured with a reference angle of 0° being when a cutter tip on its end is perpendicular to the plane of the face to be refaced or, in other words, parallel with the direction of the axis the threads 23 of the pin connection 20.

The type of cutter or abrasive used on the torque-stop face plate 63 and the primary face plate 65 may be the same or different, depending on the refacing that a target connection requires. Also, multiple abrasives and/or cutters may be used in sequence to reface the connection. For example, a cutter may be employed initially to remove material and then an abrasive disc may be used to smooth and shine the same face.

Mandrel

The pin-end refacing tool 60 also comprises a mandrel 67 as exemplified in FIGS. 9, 10, 17, and 18. The mandrel 67 may be comprised of a metal, an alloy, or a suitable composite. For example, the mandrel 67 may be made of steel, stainless steel, aluminum, titanium, copper, brass, metal alloy, plastic composite, polymer composite, or carbon fiber composite. The mandrel 67 is configured to screw onto the threads 23 of the target pin-end connection 20 thereby attaching the tool to the pin-end connection 20 while maintaining a perpendicular orientation of the torque-stop face plate 63 and primary face plate 65 with the direction of the axis of the threads 23 of the pin-end connection 20.

The mandrel 67 is configured to be screw onto the threads 23 a pin-end connection 20. The mandrel 67 may vary in size, depending on the size of connection to be refaced. Because pin-end connections 20 typically have tapered threads 23, the mandrel 67 may be configured with internal threads, such as tapered threads 93, which can screw onto external threads of the pin-end of the pipe. Here again, the threads may vary in size depending on the connection to be refaced. The mandrel 67 is thus configured with a corresponding thread form, threads per inch, and taper to that of the target pin-end connection 20, thereby ensuring that the shaft 62, which runs through the center of the mandrel 67 via a center hole 94 is parallel to the axis of the connection threads 23. The mandrel 67 ensures that the face plates 63, 65 reface the torque-stop face 22 and primary face 21 of the pipe perpendicular to the direction of the axis of the threads 23 of the pin-end connection 20 to be refaced.

The shaft 62 runs through the center of the mandrel 67 via a cylindrical center hole 94 and the barrel 61 or cap 76/sleeve 77 combination fits around mandrel. In other words, the barrel 61 or cap 76/sleeve 77 combination is inserted over the mandrel 67 so that the mandrel fills the inner space 75/84.

The cylindrical hole may be configured with one or more bearings 95 that the shaft rides on to facilitate the rotation of the assembly.

Pipe

The apparatuses and tools according to the disclosure may be used on connections that employ a double shoulder configuration. The tools and methods are especially useful on high-torque pipe made by Grant Prideco and other manufacturers. For example, the following Grant Prideco pipe types may be refaced with the tools and methods of the disclosure:

GDPS pipe including DS26 Box and Pin, DS31 Box and Pin, DS38 Box and Pin, DS26 Box and Pin, DS26 Box and Pin, DS31 Box and Pin, DS38 Box and Pin, DS40 Box and Pin, DS46 Box and Pin, DS50 Box and Pin, DS55 Box and Pin, DS65 Box and Pin, and 2-7/8 PAC DSI Box and Pin;

XT pipe including XT24 Box and Pin, XT26 Box and Pin, XT27 Box and Pin, XT29 Box and Pin, XT30 Box and Pin, XT31 Box and Pin, XT34 Box and Pin, XT38 Box and Pin, XT39 Box and Pin, XT40 Box and Pin, XT43 Box and Pin, XT46 Box and Pin, XT50 Box and Pin, XT54 Box and Pin, XT55 Box and Pin, XT57 Box and Pin, XT61 Box and Pin, XT65 Box and Pin, XT69 Box and Pin, and XTF39 Box and Pin;

HT 2-3/8 SLH90 Box and Pin, HT 2-3/8 PAC Box and Pin, HT 2-7/8 OH Box and Pin, HT 2-7/8 PAC Box and Pin, HT26 Box and Pin, HT31 Box and Pin, HT34-256 MPAC Box and Pin, HT38 Box and Pin, HT40 Box and Pin, HT40 TTC Box, HT46 Box and Pin, HT50 Box, HT50 TTC Box, HT50 Pin & Box, HT55-375 Box and Pin, and HT65 Box and Pin; and TurboTorque® 380 Pin and Box, TurboTorque® 390 Pin and Box, TurboTorque® 420 Pin and Box, TurboTorque® 435 Pin and Box, TurboTorque® 485 Pin and Box, TurboTorque® 500 Pin and Box, TurboTorque® 525 Pin and Box, TurboTorque® 550 Pin and Box, TurboTorque® 585 Pin and Box, and TurboTorque® 690 Pin and Box.

Methods

The tools described above may be used to reface high-torque pipe connections.

In refacing a box-end, the box-end refacing tool is employed. Depending on the configuration of the tool, the tool may be assembled prior to attachment of the tool to the box-end 10 or during attachment of the tool into the box-end 10. In either case, the mandrel 32 is screwed into the threading 13 of the box-end connection 13, optionally by using a wrench 50 or other leveraging device.

After attaching the tool to the connection, the protruding end of the shaft 31 is connected to a driver at a connection point 38. The driver is operated to rotate the shaft 31. The operator may apply pressure to the shaft 31, thereby forcing the rotating refacing plates 33, 35 to engage one or both faces 11, 12 of the pipe. Upon engagement, the abrasive or cutter removes material from one or both faces 11, 12. Once the pipe has been refaced, the mandrel 32 is unscrewed thereby removing the tool from the connection. Thereafter, the refaced surface is inspected to ensure that acceptable tolerances have been achieved.

In other methods, one or both faces may be refaced. When both faces are to be refaced, they may be refaced individually, simultaneously, or sequentially. For example, the distance between the faces may be first corrected by removing material from the torque-stop face 12 with an abrasive or cutter. If a considerable amount of material needs to be removed, an aggressive abrasive or a cutter may be employed. After correcting the distance, the primary face 11 may be refaced by engaging the tool onto the primary face 11 individually, or by engaging the tool onto both the primary face 11 and the torque-stop face 12 at the same time.

In refacing a pin-end, the pin-end refacing tool is employed. Depending on the configuration of the tool, the tool may be assembled prior to attachment of the tool to the pin-end 20 or during attachment of the tool into the pin-end 20. In either case, the mandrel 67 is screwed on to the threading 23 of the pin-end connection 20, optionally by using a wrench 52 or other leveraging device.

After attaching the tool to the connection, the protruding end of the shaft 62 is connected to a driver. The driver is operated to rotate the shaft 31. Rotation of the shaft turns the torque-stop refacing plate 63, the barrel 61, and the primary refacing plate 65 attached to the bottom rim 73 of the barrel 61. The operator may apply pressure to the driving shaft 70, thereby forcing the rotating refacing plates 63,65 to engage one or both faces 21, 22 of the pipe. Upon engagement, an abrasive or cutter removes material from one or both faces 21, 22. Once the pipe has been refaced, the mandrel 67 is unscrewed thereby removing the tool from the connection. Thereafter, the refaced surface is inspected to ensure that acceptable tolerances have been achieved.

One or both faces may be refaced. When both faces are to be refaced, they may be refaced individually, simultaneously, or sequentially. For example, the distance between the faces may be first corrected by removing material from the torque-stop face 22 with an abrasive or cutter. If a considerable amount of material needs to be removed, an aggressive abrasive or a cutter may be employed. After correcting the distance, the primary face 21 may be refaced by engaging the tool onto the primary face 21 individually, or by engaging the tool onto both the primary face 21 and the torque-stop face 22 at the same time.

Figure 20:
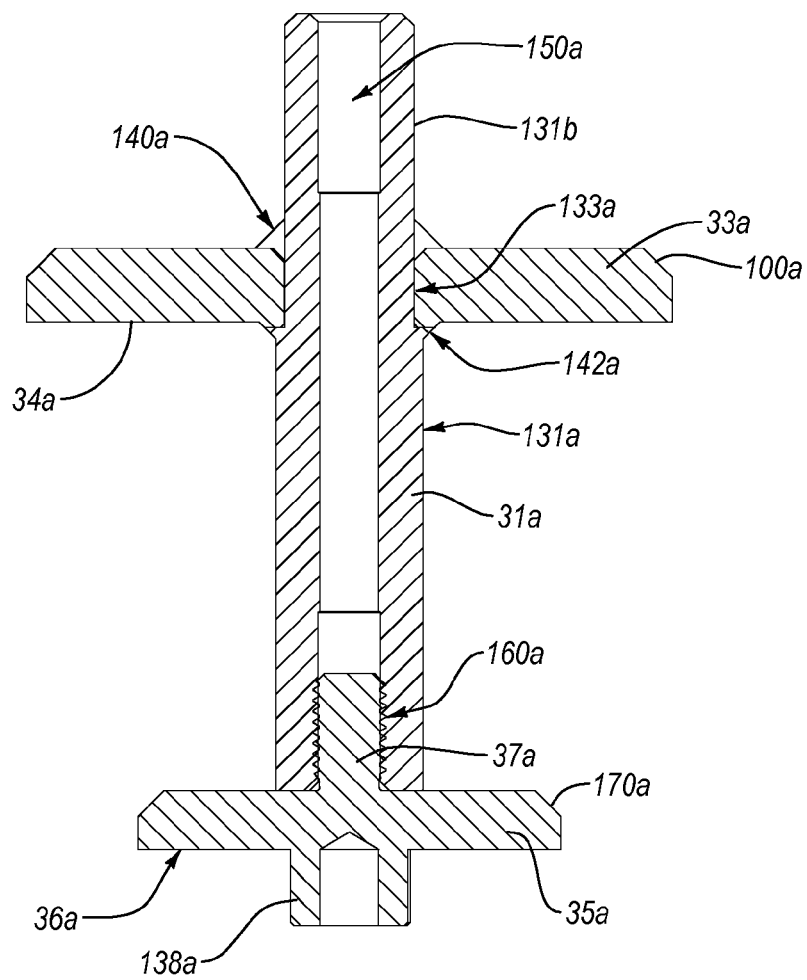
FIG. 20 illustrates a cross-sectional and exploded view of a portion of an exemplary box-end refacing tool.

In one or more implementations, as illustrated in FIG. 20, the box-end refacing tool 30 (FIG. 3) also may include a primary face plate 33a that has one or more chamfers or bevels. Except as otherwise described herein, the primary face plate 33a may be similar to or the same as the primary face plate 33 (FIGS. 3, 4) described above. In some instances, the primary face plate 33a may include a front bevel 100a, which may span about a non-abrasive or proximal surface of the primary face plate 33a. In some instances, the front bevel 100a may provide improved safety for the operator of the box-end refacing tool. Particularly, as the primary face plate 33a rotates, the front bevel 100a may prevent cuts or other injuries to the operator, which, for example, may occur due to unintentional contact with a primary face plate that has a sharp edge.

Implementations may include the primary face plate 33a that has the front bevel 100a oriented at approximately 45° relative to the proximal surface of the primary face plate 33a. Additionally, the front bevel 100a may extend away from the proximal surface approximately one-half of the thickness of the primary face plate 33a. For instance, the primary face plate 33a may be approximately 0.63" thick and the front bevel 100a may extend to a distance of approximately 0.31" (e.g., the front bevel 100a may be 0.31×45°; 0.25×45°; 0.23×45°, etc.). It should be appreciated, however, that the front bevel 100a may have any number of suitable configurations and sizes, which may vary from one implementation to the next. Furthermore, in lieu of or in addition to the front bevel 100a, the primary face plate 33a may include a radius or a similar feature, which may remove an otherwise sharp edge at the proximal surface and/or at the abrasive surface 34a.

It should be appreciated that reference to any surface as "abrasive" is made only for convenience of description and shall not be interpreted as limiting. More specifically, an "abrasive surface" may include any surface configured to reface at least a portion of the pipe, in a manner described herein. An abrasive surface may include a cutting or cutter tip that may remove material and thereby resurface or reface a face of the pipe.

In addition, similar to or the same as the primary face plate 33 (FIGS. 3, 4) described above, the primary face plate 33a may connect to a shaft 31a, which may be similar to or the same as the shaft 31 (FIGS. 3, 4), except as otherwise described herein. For instance, the first portion of the shaft 31a may have a major outside diameter 131a and a second portion of the shaft 31a may have a minor outside diameter 131b, which together may form a step therebetween. In one example, the step may be approximately 0.050" (i.e., the minor outside diameter 131b may be 0.100" smaller that the major outside diameter 131a).

Furthermore, the primary face plate 33a may include a hole 133a that may accept the second portion of the shaft 31a, which has the minor outside diameter 131b. For example, the hole 133a may have a clearance of approximately 0.005" relative to the minor outside diameter 131b of the second portion of the shaft 31a. As such, the primary face plate 33a may slide over the second portion of the shaft 31a and may abut the step formed between the major outside diameter 131a and the minor outside diameter 131b.

In some implementations, a manufacturer may weld, braze, fasten, press fit, or otherwise secure the primary face plate 33a to the shaft 31a. In one implementation, a weld 140a may permanently secure the primary face plate 33a to the shaft 31a. Alternatively, the primary face plate 33a and the shaft 31a may be integrated together, forming a substantially monolithic, single unit. Additionally or alternatively, the manufacturer may weld the primary face plate 33a to the shaft 31a on or about the abrasive surface 34a of the primary face plate 33a. More specifically, a weld 142a may connect the primary face plate 33a to the shaft 31a. In any event, the primary face plate 33a and, particularly, the abrasive surface 34a, may be oriented approximately perpendicularly relative to the shaft 31a.

As noted above, the shaft 31a together with the primary face plate 33a and the torque-stop face plate 35a may rotate within the mandrel 32 (FIGS. 3, 7). In one implementation, the second portion that has the major outside diameter 131a may be slidably and/or rotatably positioned within the mandrel. For instance, the second portion may rotate within or together with the bearings 45 (FIGS. 3, 7). Also, the second portion may slide along a longitudinal or center axis of the mandrel in proximal and/or distal directions.

The shaft 31*a* also may include a through hole 150*a*, which may pass through the shaft 31*a* along the length thereof. The through hole 150*a* may increase the overall surface area of the shaft 31*a*, which may allow the shaft 31*a* to have better or more even cooling during the welding process (i.e., while the manufacturer welds the primary face plate 33*a* to the shaft 31*a*). As such, the through hole 150*a* may reduce or eliminate warping of the shaft 31*a* and/or of the primary face plate 33*a*, which may result from uneven heating or cooling of the shaft 31*a* and/or primary face plate 33*a* during and/or after welding. Hence, the manufacturer may not need to further machine the shaft 31*a* and/or primary face plate 33*a* to obtain required tolerances.

Also, the through hole 150*a* may include an internal thread 160*a* on a distal end thereof. In at least one implementation, the thread 160*a* may accept a corresponding, mating end of a threaded member 37*a*. In some instances, the threaded member 37*a* may connect a torque-stop face plate 35*a* to the shaft 31*a*. The torque-stop face plate 35*a* may be similar to or the same as the torque-stop face plate 35 (FIGS. 3, 5A-6B), except as described herein. For instance, implementations may include the torque-stop face plate 35*a* that has an abrasive surface 36*a*, which may be similar to or the same as the abrasive surface 36 (FIGS. 3, 5A-6B).

In one or more implementations, the torque-stop face plate 35*a* also may include a chamfer or a bevel 170*a*. Implementations may include the torque-stop face plate 35*a* that has the bevel 170*a* that is oriented at approximately 45° relative to the proximal surface of the torque-stop face plate 35*a*. Additionally, the bevel 170*a* may extend away from the proximal surface of the torque-stop face plate 35*a* approximately one-half of the thickness of the torque-stop face plate 35*a*. For instance, the primary face plate 33*a* may be approximately 0.50" thick and the bevel 170*a* may extend to a distance of approximately 0.25" (e.g., the front bevel 100*a* may be 0.25× 45°; 0.23×45°, etc.). It should be appreciated, however, that the bevel 170*a* may have any number of suitable configurations and sizes, which may vary from one implementation to the next. Furthermore, in lieu of or in addition to the bevel 170*a*, the torque-stop face plate 35*a* may include a radius or a similar feature, which may remove an otherwise sharp edge at the proximal surface and/or at the abrasive surface 36*a*.

As noted above, the threaded member 37*a* may connect the torque-stop face plate 35*a* to the shaft 31*a*. In at least one implementation, the threaded member 37*a* may be integrated with or connected to the torque-stop face plate 35*a*. In other words, as the threaded member 37*a* screws into the thread 160*a*, the threaded member 37*a* may rotate together with the torque-stop face plate 35*a*. Alternatively, however, the threaded member 37*a* may be a separate component, which, for instance, may be inserted into a hole in the torque-stop face plate 35*a* and, after screwing into the thread 160*a*, may fasten the torque-stop face plate 35*a* to the shaft 31*a*. In any event, the torque-stop face plate 35*a* may threadedly connect to the shaft 31*a*.

Figure 11:
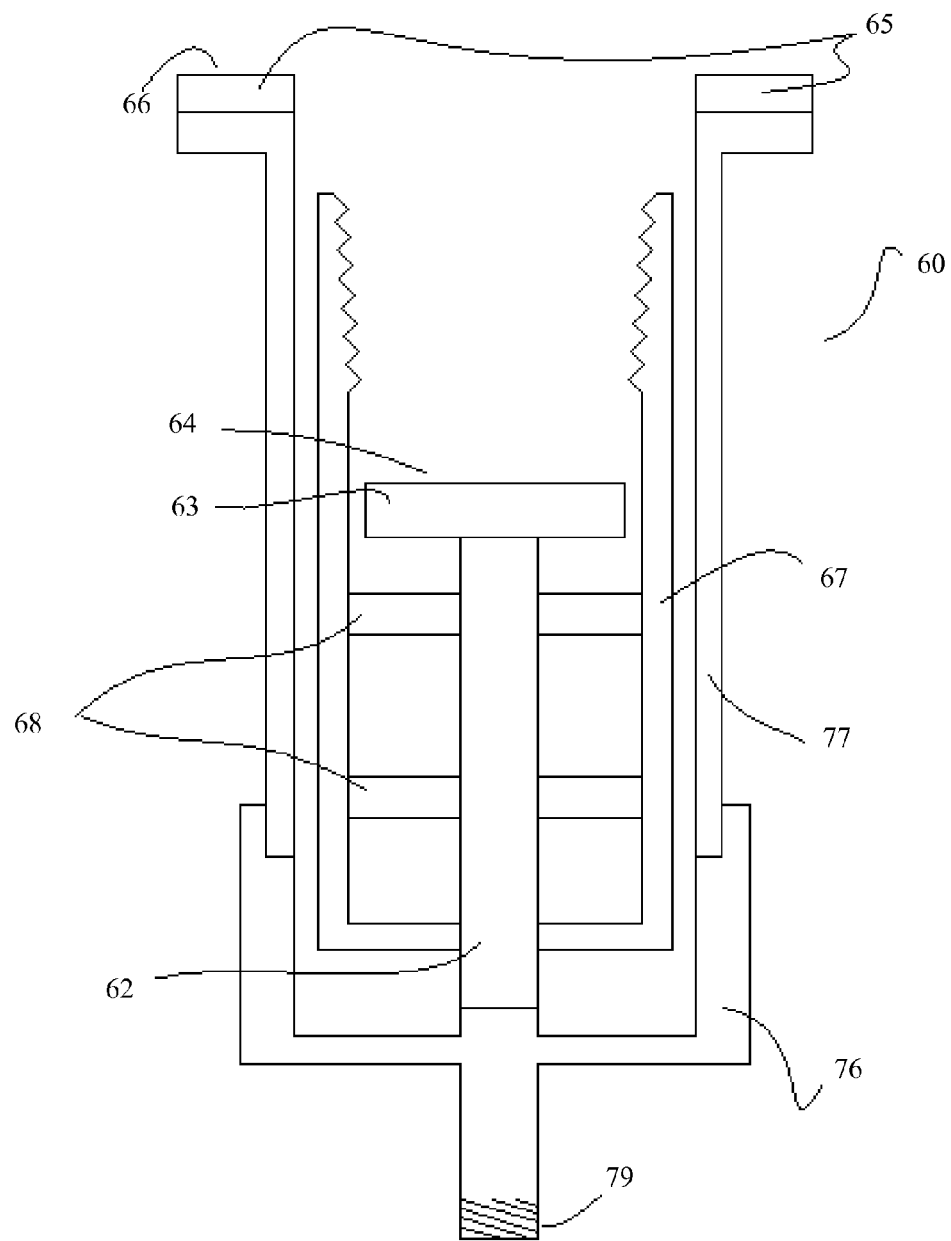
FIG. 11 illustrates a cross-sectional view of an exemplary pin-end refacing tool.
Figure 21A:
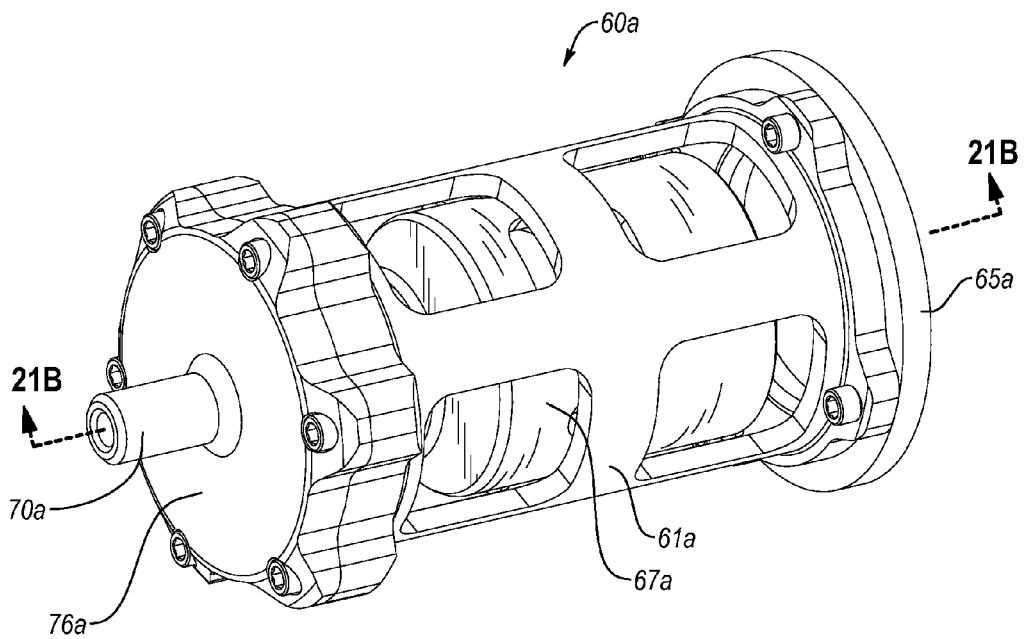
FIGS. 21A and 21B illustrate angled and cross-sectional views of an exemplary pin-end refacing tool.
Figure 21B:
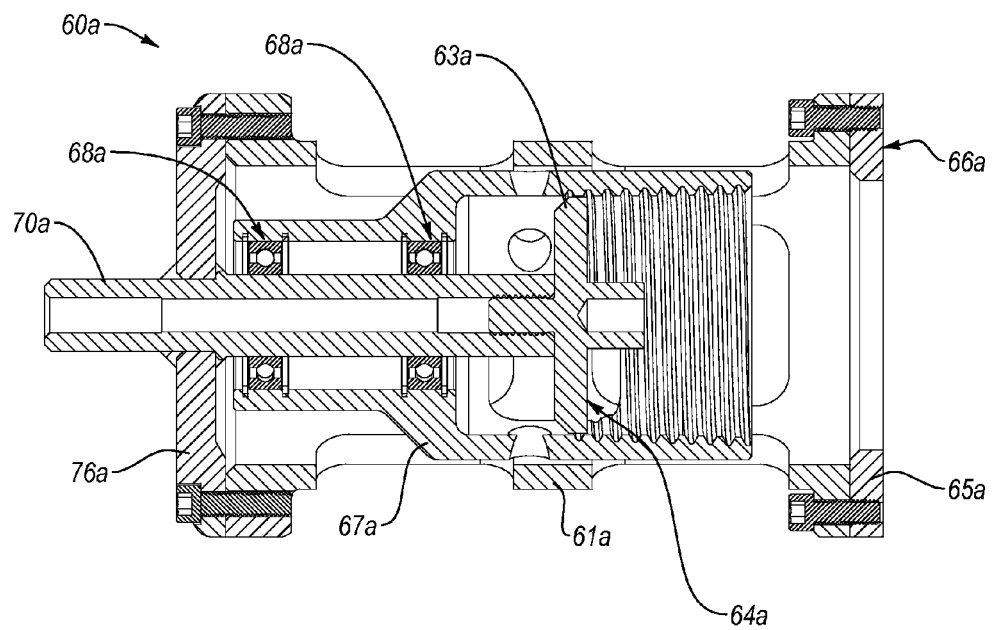

As illustrated in FIGS. 21A-21B, at least one implementation may include a pin-end refacing tool 60*a*, which may be similar to or the same as the pin-end refacing tool 60 (FIGS. 9, 11), except as otherwise described herein. In one example, the pin-end refacing tool 60*a* may include abrasive surfaces 64*a*, 66*a*, which may be similar to or the same as the abrasive surfaces 64, 66 (FIGS. 9, 11). For instance, the abrasive surface 64*a* may be located on a torque-stop face plate 63*a*, and the abrasive surface 66*a* may be located on a primary face plate 65*a*. In addition, the pin-end refacing tool 60*a* may include a barrel 61*a* that may fit over a mandrel 67*a*, which may screw over the external thread of the pin-end of the pipe. More specifically, the barrel 61*a* may slidably and rotatably fit over the mandrel 67*a*, such that the user may rotate the barrel 61*a* as well as move the barrel in proximal and distal directions along a length or center axis of the mandrel 67*a*.

The barrel 61*a* also may include a driving shaft 70*a*, which may rotate the abrasive surfaces 64*a*, 66*a* relative to the mandrel 67*a* (e.g., about a center axis of the pin-end refacing tool 60*a*). Accordingly, after threading and securing the mandrel 67*a* relative to the pin-end of the pipe, the abrasive surfaces 64*a*, 66*a* may rotate relative to the torque-stop and the primary faces of the pipe, thereby refacing such faces. To facilitate relative rotations, the mandrel 67*a* may include bearings 68*a*, which may reduce friction of the driving shaft 70*a* during the rotation thereof relative to the mandrel 67*a*.

In one or more implementations, the driving shaft 70*a* may couple to the barrel 61*a* via an approximately planar cap 76*a*, as described below in further detail. In particular, the driving shaft 70*a* may connect to the planar cap 76*a*, which in turn may connect to the barrel 61*a*. As such, the pin-end refacing tool 60*a* may have the abrasive surfaces 64*a*, 66*a* positioned at a predetermined distance relative to each other. More specifically, securing the shaft 70*a* to the barrel 61*a* via the planar cap 76*a* may facilitate precise relative positioning and orientation of the abrasive surfaces 64*a*, 66*a*.

For instance, the interfacing surfaces between the planar cap 76*a* and the barrel 61*a* may be machined flat and perpendicular to center axes of the barrel and the shaft 70*a*. Hence, the manufacturer may set a predetermined relative position of the abrasive surfaces 64*a*, 66*a* by setting the distances between the interfacing surface of the planar cap 76*a* and the abrasive surface 64*a* as well as between the interfacing surface of the barrel 61*a* and the abrasive surface 66*a*. Furthermore, connecting the planar cap 76*a* to the barrel 61*a* may position the shaft 70*a* parallel to the center axis of the barrel 61*a*. The manufacturer also may machine the abrasive surfaces 64*a*, 66*a* to be parallel to the respective center axes of the shaft 70*a* and the barrel 61*a*. Consequently, the manufacturer may orient the abrasive surfaces 64*a*, 66*a* parallel to one another. Setting the abrasive surfaces 64*a*, 66*a* at a predetermined distance from one another and at a predetermined orientation relative to each other may allow the pin-end refacing tool 60*a* to reface the torque-stop face and the primary face of the pin-end pipe simultaneously.

Figure 22:
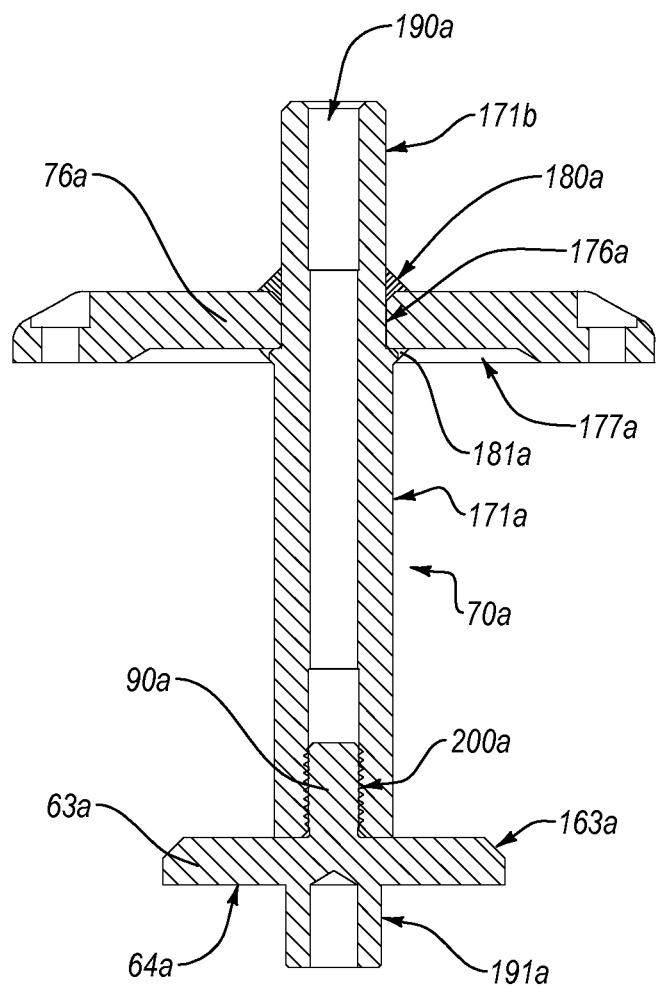
FIG. 22 illustrates a cross-sectional view of a portion of the pin-end refacing tool of FIGS. 21A and 21B.

Additionally, as illustrated in FIG. 22, the driving shaft 70*a* may include a first portion having a major outside diameter 171*a* and a second portion having a minor outside diameter 171*b*, which together may form a step therebetween. In one example, the step may be approximately 0.050" (i.e., the minor outside diameter 171*b* may be 0.100" smaller that the major outside diameter 171*a*). Furthermore, the planar cap 76*a* may include a hole 176*a* that may accept the second portion of the driving shaft 70*a*, which has the minor outside diameter 171*b*. For example, the hole 176*a* may have a clearance of approximately 0.005" relative to the minor outside diameter 171*b* of the second portion of the driving shaft 70*a*. As such, the planar cap 76*a* may slide over the second portion of the driving shaft 70*a* and may rest on the step formed between the major outside diameter 171*a* and the minor outside diameter 171*b*.

In some implementations, a manufacturer may weld, braze, fasten, press fit, or otherwise secure the planar cap 76*a* to the driving shaft 70*a*. In one implementation, a weld 180*a* may permanently secure the planar cap 76*a* to the driving shaft 70*a*. Additionally or alternatively, planar cap 76*a* may include a recess 177a on a distal face thereof. Hence, the first portion of the driving shaft 70a, which may have the major outside diameter 171a, may be at least partially positioned within the recess 177a.

In one or more examples, a second weld 181a may connect the planar cap 76a to the driving shaft 70a. Furthermore, implementations may include the shaft 70a integrated together with the planar cap 76a, forming a substantially monolithic, single unit. In any event, the planar cap 76a may be securely connected to the driving shaft 70a and may have an approximately perpendicular orientation relative thereto.

The driving shaft 70a also may include a through hole 190a. The through hole 190a may increase overall surface area of the driving shaft 70a, which may allow the driving shaft 70a to have better or more even cooling during the welding process (i.e., while the manufacturer welds the planar cap 76a to the driving shaft 70a). As such, the through hole 190a may reduce or eliminate warping of the driving shaft 70a and/or of the planar cap 76a, which may result from uneven heating or cooling of the driving shaft 70a and/or planar cap 76a during and/or after welding. Hence, the manufacturer may not need to further machine the driving shaft 70a and/or planar cap 76a to obtain required tolerances.

Also, the through hole 190a may include a thread 200a on a distal end thereof. In at least one implementation, the thread 200a may accept a corresponding, mating end of a threaded member 90a. In some instances, the threaded member 90a may connect the torque-stop face plate 63a to the driving shaft 70a. The torque-stop face plate 63a may be similar to or the same as the torque-stop face plate 63 (FIGS. 9, 11, 15A-15B), except as described herein. For instance, as mentioned above, implementations may include the torque-stop face plate 63a that has the abrasive surface 64a, which may be similar to or the same as the abrasive surface 64 (FIGS. 9, 11). Also, the torque-stop face plate 63a may include a nut 191a, which may allow a user to thread the threaded member 90a into the thread 200a.

Moreover, implementations may include the torque-stop face plate 63a that has a front bevel 163a oriented at approximately 45° relative to the proximal surface of the torque-stop face plate 63a. Additionally, the front bevel 163a may extend away from the proximal surface approximately one-half of the thickness of the torque-stop face plate 63a. For instance, the torque-stop face plate 63a may be approximately 0.50" thick and the front bevel 163a may extend to a distance of approximately 0.25" (e.g., the front bevel 163a may be 0.25× 45°; 0.23×45°, etc.). It should be appreciated, however, that the front bevel 163a may have any number of suitable configurations and sizes, which may vary from one implementation to the next. Furthermore, in lieu of or in addition to the front bevel 163a, the torque-stop face plate 63a may include a radius or a similar feature, which may remove an otherwise sharp edge at the proximal surface and/or at the abrasive surface 64a.

Figure 23A:
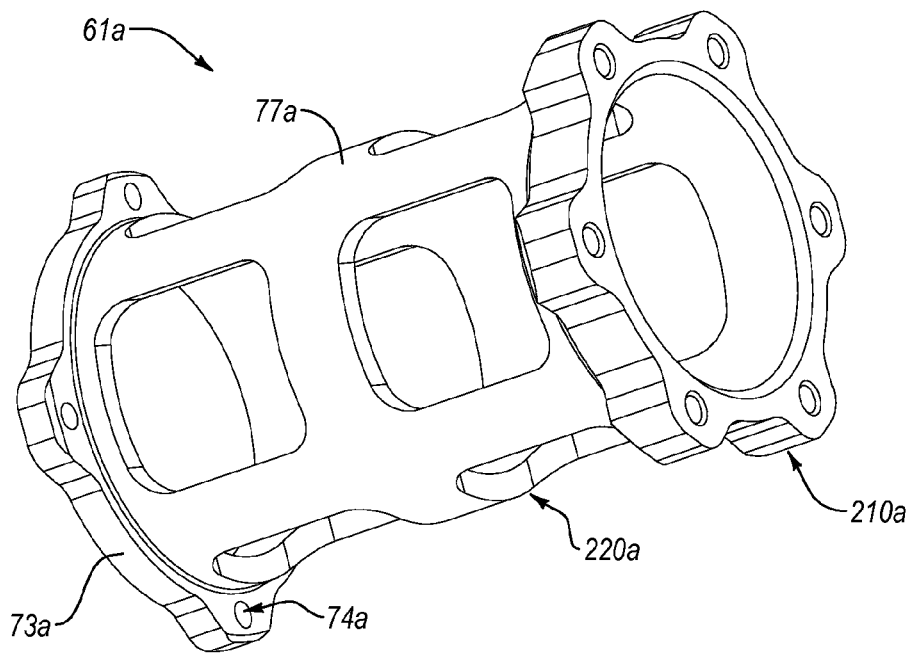
FIGS. 23A and 23B illustrate angled views of an exemplary barrel for a pin-end refacing tool.
Figure 23B:
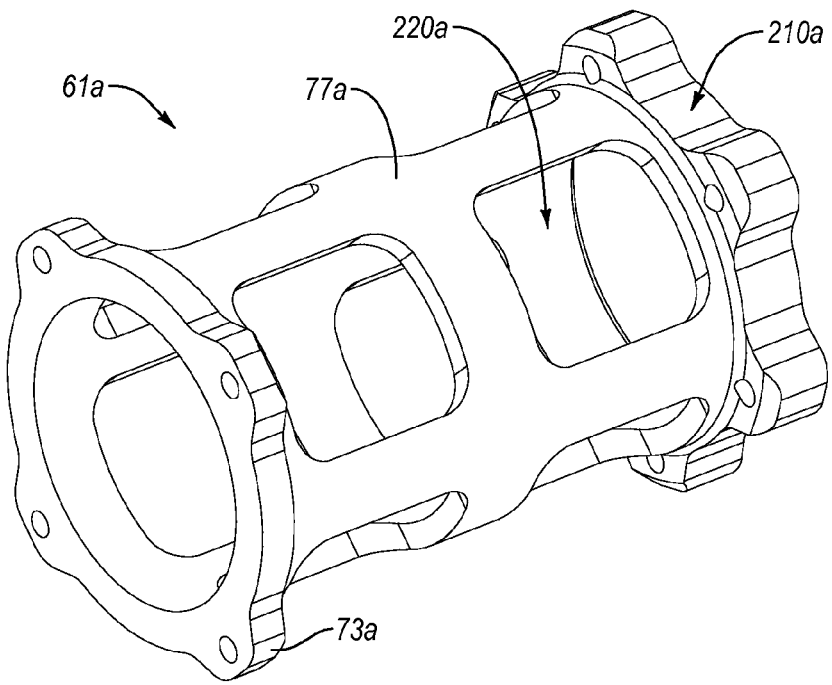

Also, as mentioned above, the pin-end refacing tool may include a barrel. Particularly, the pin-end refacing tool may include the barrel 61a, as illustrated in FIGS. 23A-23B. The barrel 61a also may include a barrel sleeve 77a, which may extend between a first or distal rim 73a and a second or proximal rim 210a. The primary face plate 65a (FIGS. 21A-21B) may connect to the distal rim 73a (e.g., with one or more fasteners, such as screws). Similarly, the planar cap 76a (FIG. 22) may connect to the proximal rim 210a with one or more fasteners, such as screws. Furthermore, as the planar cap 76a may secure the driving shaft 70a (FIG. 22), connecting the planar cap 76a (FIG. 22) to the proximal rim 210a may connect or couple the driving shaft 70a (FIG. 22) to the barrel 61a. Accordingly, rotation of the driving shaft 70a may produce rotation of the barrel 61a (together with the abrasive surface 66a (FIGS. 20, 21A-21B)).

In some instances, the barrel 61a may include openings 220a. Specific number and position(s) of the openings 220a may vary from one implementation to the next. In at least one implementation, the barrel 61a may include eight openings positioned about the peripheral surface (e.g., circumference) of the barrel sleeve 77a. Moreover, the barrel sleeve 77a may include two of the openings 220a positioned along the length of the barrel sleeve 77a. Also, the openings 220a may oppose each other, such that any two openings 220a may be aligned with another two openings 220a opposite thereof.

The openings 220a may have an approximately rectangular or square shape with rounded inner corners. Furthermore, the openings 220a may constitute the majority of the peripheral surface of the barrel sleeve 77a. In other words, more than half of the material comprising the barrel sleeve 77a may be removed by the openings 220a. As such, the barrel 61a may be lighter and easier to operate as compared with a barrel that does not include the openings 220a.

In addition, the openings 220a may provide access to the torque-stop face and/or to the primary face during the operation of the pin-end refacing tool. Consequently, an operator may inspect the condition of the torque-stop face and/or to the primary face during the operation of the pin-end refacing tool. Also, the operator may provide cooling fluid, which may cool and/or lubricate the abrasive surfaces of the pin-end refacing tool and/or of the torque-stop face and/or to the primary face of the pipe. The cooling fluid also may flush chips or particles produced during the operation of the pin-end refacing tool, which may improve the refacing process of the torque-stop face and/or to the primary face.

It should be appreciated that the barrel 61a may have any suitable length, which may vary from one implementation to another. Moreover, the user may connect extension portions to the barrel 61a to obtain a suitable length therefor. For example, an extension may bolt onto the proximal rim 210a of the barrel 61a, and the shaft 70a and/or the planar cap 76a (FIGS. 21A-22) may connect to the extension. Similarly, an extension may connect to the distal rim 73a, and the primary face plate may connect to the extension. The user may connect any number of extensions to the barrel 60a, to achieve a suitable length.

Figure 24:
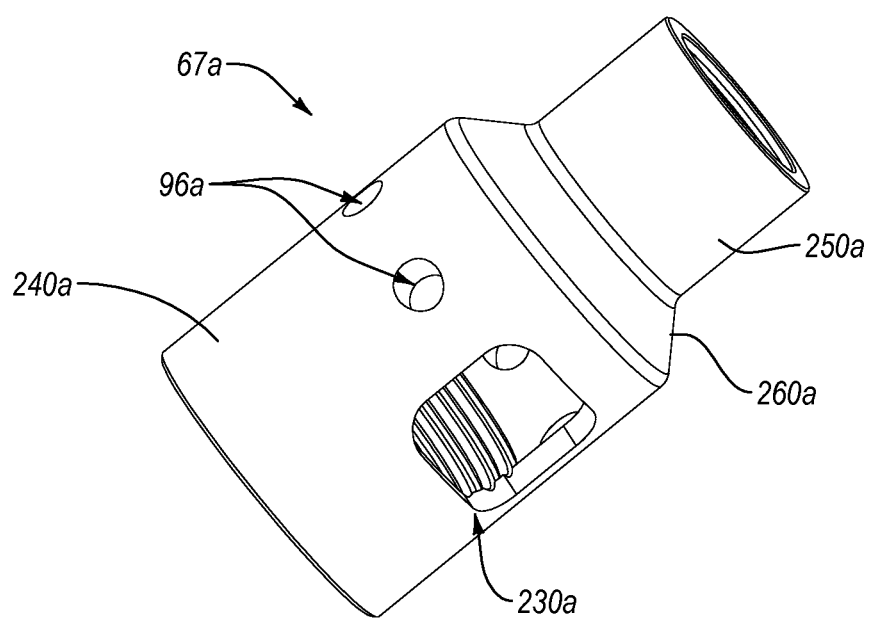
FIG. 24 illustrates an exemplary mandrel for a pin-end refacing tool.

Hence, to allow fluid to flow to or near the torque-stop face, the mandrel 67a also may include one or more openings 230a, as shown in FIG. 24. For instance, the mandrel 67a may include two openings 230a. In at least one implementation, the openings 230a may have an approximately rectangular or square shape, which may have rounded inner corners. Hence, the cooling fluid may flow through the openings 220a (FIGS. 23A-23B), through the openings 230a, and to the torque-stop face of the pipe.

The mandrel 67a also may have a first portion 240a that has a major outside diameter and a second portion 250a that has a minor outside diameter. In at least one implementation, the mandrel 67a also may include a transition portion 260a, which may extend between the second portion 250a and the first portion 240a. In one example, the transition portion 260a may be a tapered cylinder, which may provide an angled transition between the first portion 240a and the second portion 250a.

Also, in addition to or in lieu of openings 230a, the mandrel 67a may include holes 96a. Specifically, the holes 96a may allow a user to screw the mandrel 67 onto the threading of the pin-end of the pipe. In some instances, the user may access the holes 96a through the openings 220a (FIGS. 23A-23B). In any case, the mandrel 67a may be screwed onto the pin-end of the pipe. Subsequently, the user may rotate the driving shaft 70a (FIGS. 21A-21B) together with the barrel 61a as well as with the abrasive surfaces 64a, 66a, thereby refacing the torque-stop face and/or to the primary face of the pin-end of the pipe.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes that come within the meaning and range of equivalency of the claims are to be embraced within their scope.

I claim:

1. A high-torque pipe pin-end connection refacing tool, comprising:
    a shaft having a first end and a second end;
    a barrel attached to the shaft such that the first end of the shaft is disposed at least partially within the barrel;
    a primary face refacing plate attached to a rim of the barrel;
    a torque-stop refacing plate attached to the first end of the shaft; and
    a mandrel located in between the shaft and the barrel, the mandrel comprising a bearing that contacts the shaft.

2. A refacing tool according to claim 1, wherein the torque-stop refacing plate is removably attached to the first end of the shaft.

3. A refacing tool according to claim 1, wherein the primary face refacing plate is removably attached to the rim of the barrel.

4. A refacing tool according to claim 1, wherein the torque-stop refacing plate and the primary face refacing plate each comprise an abrasive contact face or a cutter.

5. A refacing tool according to claim 1, wherein the mandrel is configured with threads to screw on to a pin-end of a pipe to be refaced.

6. A refacing tool according to claim 1, wherein the barrel is slidably and rotatably fitted over the mandrel.

7. A refacing tool according to claim 1, wherein the barrel comprises a sleeve and a cap.

8. A refacing tool according to claim 7, wherein the sleeve attaches to the cap by a threaded connection.

9. A method of refacing a pin-end of a high-torque connection, comprising:
    inserting the tool according to claim 1 on to the pin-end connection by screwing the mandrel on to the pin-end connection, and
    rotating the barrel and shaft to drive the primary face and torque-stop refacing plates to remove material from a primary face and/or a torque-stop face of the connection.

10. A refacing tool for refacing torque-stop and primary faces of a pin-end of a pipe, the refacing tool comprising:
    a mandrel having internal threads configured to screw onto external threads of the pin-end of the pipe, the mandrel including one or more bearings;
    a barrel slidably and rotatably fitted over the mandrel, the barrel comprising a distal rim;
    a primary face refacing plate connected to or integrated with the distal rim of the barrel;
    a driving shaft coupled to the barrel, the driving shaft being rotatably and slidably secured at least partially within the mandrel and in the one or more bearings; and
    a torque-stop refacing plate connected to the driving shaft and positioned within the mandrel.

11. The refacing tool as recited in claim 10, wherein the mandrel has one or more openings in a sidewall.

12. The refacing tool as recited in claim 11, wherein the barrel has one or more tightening holes in a sidewall, the one or more tightening holes being configured to receive a tool therein to enable screwing and tightening of the mandrel onto a pin-end of a pipe to be refaced.

13. The refacing tool as recited in claim 10, wherein the torque-stop refacing plate is threadably secured to a distal end of the driving shaft.

14. The refacing tool as recited in claim 10, wherein the torque-stop refacing plate is linked to the barrel such that the torque-stop refacing plate rotates with the barrel.

15. The refacing tool as recited in claim 10, wherein the barrel and the driving shaft are connected together in a fixed manner.

16. The refacing tool as recited in claim 15, wherein the barrel and the driving shaft cooperate to maintain the primary face refacing plate and the torque-stop refacing plate spaced apart at a predetermined distance.

17. A refacing tool for refacing torque-stop and primary faces of a pin-end of a pipe, the refacing tool comprising:
    a barrel rotatable by a drive mechanism;
    a shaft connected to the barrel;
    a primary face refacing plate connected to or integrated with a distal end of the barrel for refacing a primary face of a pin-end of a pipe;
    a mandrel disposed within the barrel, such that the barrel can rotate and slide relative to the mandrel, the mandrel comprising internal threads configured to screw onto external threads of the pin-end of the pipe, the mandrel further comprising a bearing that contacts the shaft such that the shaft can rotate and slide within the bearing of the mandrel; and
    a torque-stop refacing plate linked to the barrel such that the torque-stop refacing plate rotates with the barrel, the torque-stop refacing plate being positioned within the mandrel at a fixed distance from the primary face refacing plate.

18. The refacing tool as recited in claim 17, wherein the shaft has a first end and a second end, the second end being configured to connect the barrel to a drive mechanism for rotating the barrel and the shaft in unison.

19. The refacing tool as recited in claim 18, wherein the first end of the shaft is disposed within the barrel and the shaft is slidably and rotatably mounted at least partially within and relative to the mandrel.

20. The refacing tool as recited in claim 18, wherein the torque-stop refacing plate is connected to the first end of the shaft such that the barrel, the primary face refacing plate, the shaft, and the torque-stop refacing plate move in unison.

* * * * *